United States Patent [19]
Antonenko et al.

[11] Patent Number: 6,149,869
[45] Date of Patent: Nov. 21, 2000

[54] CHEMICAL SYNTHESIZERS

[75] Inventors: Valery V. Antonenko, Cupertino; Nicolay V. Kulikov, Redwood City, both of Calif.

[73] Assignee: Glaxo Wellcome Inc., Research Triangle Park, N.C.

[21] Appl. No.: 09/058,971

[22] Filed: Apr. 10, 1998

Related U.S. Application Data

[63] Continuation-in-part of application No. 08/947,476, Oct. 10, 1997, which is a continuation-in-part of application No. 08/736,317, Oct. 23, 1996.

[51] Int. Cl.[7] .................................................. C12M 1/02
[52] U.S. Cl. ......................... 422/99; 366/216; 366/218; 422/101; 435/286.7; 435/297.1
[58] Field of Search .................. 422/99, 101; 435/297.1, 435/297.5, 286.7; 366/209, 216, 218

[56] References Cited

U.S. PATENT DOCUMENTS

| | | |
|---|---|---|
| 3,735,964 | 5/1973 | Lorenzen . |
| 3,944,188 | 3/1976 | Parker et al. . |
| 4,111,754 | 9/1978 | Park . |
| 4,598,049 | 7/1986 | Zelinka et al. . |
| 4,747,693 | 5/1988 | Kahl . |
| 4,894,343 | 1/1990 | Tanaka et al. . |
| 4,948,442 | 8/1990 | Manns . |
| 5,047,215 | 9/1991 | Manns . |
| 5,147,608 | 9/1992 | Hudson et al. . |
| 5,183,744 | 2/1993 | Kawamura et al. . |
| 5,186,844 | 2/1993 | Burd et al. . |
| 5,272,081 | 12/1993 | Weinreb et al. . |
| 5,273,718 | 12/1993 | Sköld et al. . |
| 5,308,757 | 5/1994 | Kawamura et al. . |
| 5,384,261 | 1/1995 | Winkler et al. . |
| 5,457,527 | 10/1995 | Manns et al. . |
| 5,472,672 | 12/1995 | Brennan . |

(List continued on next page.)

FOREIGN PATENT DOCUMENTS

| | | |
|---|---|---|
| 1 304 916 | 7/1992 | Canada . |
| 0 787 527 | 8/1997 | European Pat. Off. . |
| 196 02 464 | 7/1997 | Germany . |
| 1 509 826 | 5/1978 | United Kingdom . |
| WO91/07504 | 5/1991 | WIPO . |
| WO 94/06902 | 3/1994 | WIPO . |
| WO94/05394 | 3/1994 | WIPO . |
| WO94/14972 | 7/1994 | WIPO . |
| WO95/01559 | 1/1995 | WIPO . |
| WO96/03212 | 2/1996 | WIPO . |

(List continued on next page.)

OTHER PUBLICATIONS

This reference is a picture of HP 7686 Solution–Phase Synthesizer by Hewlett Packard.
This reference is a picture of a MultiReactor™ Synthesizer by RoboSynthon, Inc.
This reference is a picture of a STEM Reacto–Stations™ Synthesizer by STEM Corporation.
This reference is a picture of an RS 1000 with air–cooled reflux module.

(List continued on next page.)

*Primary Examiner*—Jan Ludlow
*Attorney, Agent, or Firm*—Darin J. Gibby; Lauren L. Stevens

[57] ABSTRACT

The invention provides improved chemical synthesizers and methods for their use. In one exemplary embodiment, a chemical synthesizer system has a reaction vessel block having a plurality of reaction vessels which are adapted to hold solid supports. A wash plate is removably attachable to a top end of the reaction vessel block. The wash plate has a plurality of fluid delivery orifices which are aligned with the reaction vessels when the wash plate is attached to the top end of the reaction vessel block. In this way, fluids may be supplied to each of the reaction vessels through the orifices. The system can include a vortex mixer that is held stationary by evacuation a cavity formed between the mixer base and a gasket.

4 Claims, 18 Drawing Sheets

U.S. PATENT DOCUMENTS

| | | |
|---|---|---|
| 5,503,805 | 4/1996 | Sugarman et al. . |
| 5,506,141 | 4/1996 | Weinreb et al. . |
| 5,516,491 | 5/1996 | Kath et al. . |
| 5,529,756 | 6/1996 | Brennan . |
| 5,565,324 | 10/1996 | Still et al. . |
| 5,585,275 | 12/1996 | Hudson et al. . |
| 5,599,688 | 2/1997 | Grass . |
| 5,604,130 | 2/1997 | Warner et al. . |
| 5,609,826 | 3/1997 | Cargill et al. . |
| 5,620,894 | 4/1997 | Barger et al. . |
| 5,622,699 | 4/1997 | Ruoslahti et al. . |
| 5,639,428 | 6/1997 | Cottingham . |
| 5,650,489 | 7/1997 | Lam et al. . |
| 5,665,975 | 9/1997 | Kedar . |
| 5,688,696 | 11/1997 | Lebl . |
| 5,712,171 | 1/1998 | Zambias et al. . |
| 5,725,831 | 3/1998 | Reichler et al. . |
| 5,770,157 | 6/1998 | Cargill et al. . |
| 5,792,430 | 8/1998 | Hamper . |
| 5,888,830 | 3/1999 | Mohan et al. . |

FOREIGN PATENT DOCUMENTS

| | | |
|---|---|---|
| WO96/16078 | 5/1996 | WIPO . |
| WO96/42004 | 12/1996 | WIPO . |
| WO97/06890 | 2/1997 | WIPO . |
| WO 97/10896 | 3/1997 | WIPO . |
| WO97/09353 | 3/1997 | WIPO . |
| WO97/42216 | 11/1997 | WIPO . |
| WO 97/45443 | 12/1997 | WIPO . |
| WO97/45455 | 12/1997 | WIPO . |
| WO98/05424 | 2/1998 | WIPO . |
| WO98/06490 | 2/1998 | WIPO . |
| WO98/08092 | 2/1998 | WIPO . |

OTHER PUBLICATIONS

This reference is a picture of a RAM™ Synthesizer.

This reference is a picture of a Nautilus™ 2400 Synthesizer by Argonaut Technologies, Inc.

This reference is a picture of a Model 496 Multiple Organic Synthesizer by Advanced ChemTech.

This reference is a picture of MicroKans® and MicroTubes® by IRORI. These are used in an AccuTag™100 Combinatorial Chemistry System by IRORI.

This reference is a picture of an AutoSort™–10K Microreactor Sorting System by IRORI.

This reference is a picture of SOPHAS M Solid Phase Synthesizer by Zinsser Analytic.

This reference is a picture of a Quest 210 Synthesizer by Argonaut Technologies.

This refers to pictures of an APOS 1200 Synthesizer by Rapp Polymere GmbH.

Baiga (1998), "Integrated Instrumentation for High–Throughput Organic Synthesis," Presented at Cambridge Healthtech Institute's Third Annual Symposium "High–Throughput Organic Synthesis", Mar. 5–6, Coronodo, California.

Baldwin et al. (1995), "Synthesis of a Small Molecule Library Encoded with Molecular Tags," J. Am. Chem. Soc. 117:5588–5589.

Bergot (1998), "Combinatorial Chemistry Workstation to Facilitate Pharmaceutical Development," Presented at Cambridge Healthtech Institute's Third Annual Symposium "High–Throughput Organic Synthesis", Mar. 5–6, Coronodo, California.

Brenner and Lerner (1992), "Encoded combinatorial chemistry," Proc. Natl. Acad. Sci. U.S.A. 89:5381–5383.

Campbell (1998), "Automating Solid–Phase Synthesis without Compromise," Presented at Cambridge Healthtech Institute's Third Annual Symposium "High–Throughput Organic Synthesis," Mar. 5–6, Coronodo, California.

Cargill et al. (1995), "Automated Combinatorial Chemistry on Solid Phase," Proceedings of the International Symposium on laboratory Automation and Robotics 1995. Zymark Corporation, Zymark Center, Hopkinton, MA, pp. 221–234.

Cargill et al. (1996), "Automated Combinatorial Chemistry on Solid Phase," Laboratory Robotics and automation, 8:139–148.

Czarnik, A.W. (1997) No static at all: using radiofrequency memory tubes without (human) interference. Abstract at the Association for Laboratory Automation Labautomation' 97 Conference, 1997 Jan. 18–22, San Diego. On the World Wide Web URL http://labautomation.org.

Czarnik and Nova (1997), "No static at all." Chemistry in Britain, Oct., pp. 39–41.

Daniels et al. (1990), "Membranes as novel solid supports for peptide synthesis," Peptides, Proceedings of the Eleventh American Peptide Symposium Jul. 9–14, 1998 (Rivier and Marshall, eds.), pp. 1027–1028.

DeWitt et al. (1996), "Combinatorial Organic Synthesis Using Park–Davis Diversomer Method," Acc. Chem. Res. 29:114–122.

DeWitt et al. (1994), "Diversomer technology: solid phase synthesis, automation, and integration for the generation of chemical diversity," Drug Dev. Res. 33:116–124.

DeWitt et al. (1996), "A modular System for combinatorial and Automated Synthesis" in "Molecular Diversity and Combinatorial Chemistry: Libraries and Drug Discovery. ACS Conference Proceedings Series" (Chaiken and Janda Eds.) pp. 207–218. American Chemical Society, Washington DC.

DeWitt et al. (1995), "Automated synthesis and combinatorial chemistry," current Opinion in Biotechnology 6:640–645.

DeWitt et al. (1993), "Diversomers": An approach to non-peptide, nonoligomeric chemical diversity. Proc. Natl. Acad. Sci. U.S.A. 90:6909–6913.

Floyd et al. (1997), "The Automated Synthesis of Organic Compunds—some Newcomers Have Some Success" in "Proceedings of the International Symposium on Laboratory Automation and Robotics 1996" pp. 51–76. Zymark Corporation, Zymark Center, Hopkinton, MA.

Frank (1994), "Spot–synthesis: An easy and flexible tool to study molecular recognition," Innovation and Perspectives in Solid Phase Synthesis, (Epton, ed.), pp. 509–512.

Frank et al. (1988), "Simultaneous multiple peptide synthesis under continuous folw conditions on cellulose paper discs as segmental solid supports," Tetrahedron 44:6031–6040.

Furka et al. (1991), "General method for rapid synthesis of multicomponent peptide mixtures," Int. J. Pept. Protein Res. 37:487–493.

Gooding et al. (1996), "Boosting the Productivity of Medicinal Chemistry Through Automation Tools, Novel Technological Developments Enable a Wide Range of Automated Synthetic Procedures" in "Molecular Diversity and Combinatorial chemistry: Libraries and Drug Discovery. ACS Conference Proceedings Series" (Chaiken et al.) pp. 199–206. American Chemical Society, Washington, DC.

Harness (1996), "Automation of High–Throughput Synthesis. Automated Laboratory Workstations Designed to Perform and Support Combinatorial Chemistry" in "Molecular Diversity and Combinatorial Chemistry: Libraries and Drug Discovery. ACS Conference Proceedings Series" (Chaiken et al.) pp. 188–198. American Chemical Society, Washington, DC.

Kerr et al. (1993), "Encoded combinatorial peptide libraries containing non–natural amino acids," J. Am. Chem. Soc. 115:2529–2531.

Lam et al. (1991), "A new type of synthetic peptide library for identifying ligand–binding activity," Nature (London), 354:82–84.

Lashkari et al. (1995), "An automated multiplex oligonucleotide synthesizer: Development of high–throughput, low–cost DNA synthesis," Proc. Natl. Acad. Sci. USA 92:7912–7915.

Lebl et al. (1995), "One–bead–one–structure combinatorial libraries," Biopolymers, 37:177–198.

Meyers et al., "Multiple simultaneous synthesis of phenolic libraries," ESCOM Science Publishers B.V., Leiden, The Netherlands, Copyright 1995, Mol. Diversity, 1:13–20.

Meyers et al. (1996), "Versatile method for parallel synthesis," Methods Mol. Cell. Biol. (1996), 6:67–73.

Mjalli (1997), "Application of Automated Parallel Synthesis" in "A Practical Guide to Combinatorial Chemistry" (Czarnik et al.) Pp. 327–354. American Chemical Society, Washington, DC.

Moran et al. (1995), "Radio Frenquency Tag Encoded Combinatorial Library Method for the Discovery of Tripeptide–Substituted Cinnamic Acid Inhibitors of the Protein Tyrosine Phosphatase PTP1B," J. Am. Chem. Soc. 117:10787–10788.

Nakazawa (1994), "Chapter 20. The anisotropic principle," in Principles of Precision Engineering, Oxford University Press, pp. 212–228.

Nestler et al. (1994), "A General Method for Molecular Taggin of Encoded Combinatorial Chemistry Libraries," J. Org. Chem. 59:4723–4724.

Ni et al. (1996), "Versatile Approach to Encoding combinatorial Organic Syntheses Using Chemically Robust Secondary Amine Tags," J. Med. Chem. 39:1601–1608.

Nicolau et al. (1995), "Radiofrequency encoded combinatorial chemistry," Angew. Chem. Int. Ed. 34:2289–2291.

Nielsen et al. (1993), "Synthetic methods for the implementation of encoded combinatorial chemistry," J. Am. Chem. Soc. 115:9812–9813.

Nikolaev et al. (1993), "Peptide–encoding for structure determination of nonsequenceable polymers within libraries synthesized and tested on solid–phase supports," Pept. Res. 6:161–170.

Ohlmeyer et al. (1993), "Complex synthetic chemical libraries indexed with molecular tags," Proc. Natl. Acad. Sci. U.S.A. 90:10922–10926.

Porco et al. (1998), "Automated chemical synthesis: chemistry development on the Nautilus 2400TM," Drugs of the Future 23:71–78.

Powers et al. (1998), "Personal Synthesizer for HTS," Genetic Eng. News, 18, No. 3, p. 14.

Rivero et al. (1997), "Equipment for the High–Throughput Organic Synthesis of Chemical Libraries" in "A Practical Guide to combinatorial chemistry" (Czarnik et al.) pp. 281–307. American Chemical Society, Washington, DC.

Salmon et al. (1993), "Discovery of biologically active peptides in random libraries: solution–phase testing after staged orthogonal release from resin beads," Proc. Natl. Acad. Sci. U.S.A. 90:11708–11712.

Stanchfield (1997), "FlexChemTM: A Modular System for High Throughput Synthesis of Small Molecules," Robbins Innovations, 5, No. 4, pp. 1–6.

Stanchfield (1998), "A Flexible, Modular System for Performing High–Throughput Synthesis of Small Molecules," Presented at Cambridge Healthtech Institute's Third Annual Symposium "High–Throughput Organic Synthesis", Mar. 5–6, Coronado, California.

Terrett et al. (1997), "Drug discovery by combinatorial chemistry—The development of a novel method for the rapid synthesis of single compounds," Chem. Eur. J. 3:1917–1920.

Veldkamp and McHugh (May 1992), "Binary Optics, " Scientific American, pp. 92–97.

Whitten et al. (1996), "Rapid Microscale Synthesis, a New Method for Lead optimization Using Robotics and Solution Phase Chemistry: Application to the Synthesis and Optimization of Corticotropin–Releasing Factor Receptor Antagonists," J. Med. Chem. 39:4354–4357.

CHEMICAL SYNTHESIZERS

This application is a continuation-in-part of U.S. patent application Ser. No. 08/947,476, filed Oct. 10, 1997, incorporated herein by reference, which is a continuation-in-part of U.S. patent application Ser. No. 08/736,317, filed Oct. 23, 1996, incorporated herein by reference.

BACKGROUND OF THE INVENTION

The invention relates generally to the field of chemical synthesizers. More particularly, the invention provides devices, systems and methods for synthesizing various diverse chemical products onto solid supports, such as beads, cleaving the synthesized compounds from the beads and preparing samples for analysis.

Diverse chemical products find a wide variety of uses, such as in drug discovery, genetic studies and the like. Exemplary diverse chemical products that are useful in scientific studies include peptides, oligonucleotides and other related materials.

The creation and analysis of diverse chemical products typically proceeds by synthesizing diverse collections of molecules onto a plurality of solid supports, such as beads, as is well known in the art (see, for example, "The Combinatorial Chemistry Catalog" (March 1998), available from NovaBiochem Corp., La Jolla, Calif., incorporated herein by reference). For many applications, it is desirable to simultaneously synthesize a wide variety of compounds onto the beads in a high throughput mode. In this manner, numerous compounds may be simultaneously synthesized in a single process, commonly referred to as parallel synthesis. To do so, a variety of synthesizers and techniques have been proposed, such as, for example, those described in U.S. Pat. No. 5,639,603, issued Jun. 17, 1997, and U.S. patent application Ser. No. 08/722,657, filed Sep. 27, 1996, now U.S. Pat. No. 5,866,342 the disclosures of which are herein incorporated by reference.

During the process of synthesis, the beads (which are typically held within a well or reaction vessel) are exposed to various liquids. For example, a typical process proceeds by exposing the beads to various reagents. Following this step, the beads are washed several times with a washing solution. After the compounds have been synthesized, the compounds are optionally cleaved from the beads, organized into samples and analyzed. Following cleavage, the removed compounds must then be organized into sample wells for analysis.

If is often preferable to transfer the cleaved compounds into the wells standard sized microtiter plates because such plates may then be used with most commercially available handling and processing equipment. For example, most automated plate readers, some speed vacuum concentrators, autosamplers, robotics liquid handling equipment, and the like require the samples to be placed into standard sized microtiter plates. However, the time and labor required to manually place samples into such plates can be extensive and considerably slow the process.

Another important aspect of the synthesis process is the temperature of the reagents during their exposure to the beads. For example, in some cases it will be desirable to synthesize the compounds at controlled temperatures which are well above or well below room temperature. It may also be desirable in some cases to vary the temperature of the reagents in a controlled manner during synthesis.

Exemplary synthesizers which have been developed to address such problems are described in copending application Ser. Nos. 08/736,317, filed Oct. 23, 1996, and 08/947,476, filed Oct. 10, 1997, the complete disclosures of which are herein incorporated by reference. Such types of chemical synthesizers have proven to be generally successful in synthesizing chemicals in a controlled environment. Even so, it would be desirable to provide various improvements to increase the versatility and efficiency of the synthesizers.

Hence, an object of the present invention is to provide an improved chemical synthesizer, peripheral equipment and methods for their use. In this way, the ability of produce large combinatorial collections of compounds will be greatly facilitated.

SUMMARY OF THE INVENTION

The invention provides exemplary chemical synthesizers and methods for their use, as well as peripheral equipment that may be used with the synthesizers. In one exemplary embodiment, the invention provides a wash plate or fluid delivery device which is useful with a chemical synthesizer having a reaction vessel block with a plurality of open reaction vessels which are adapted to hold solid supports. The wash plate has a top surface, a bottom surface, a plurality of liquid transport channels, and a plurality of gas transport channels. The plate further includes a liquid supply port for introducing liquids into the liquid transport channels and a gas supply port for introducing a gas into the gas transport channels. Further, the liquid transport channels terminate in an array of liquid delivery orifices on the bottom surface, and the gas transport channels terminate in an array of gas delivery orifices on the bottom surface. In this way, the wash plate may be placed over the reaction vessel block to introduce various liquids or gases into the reaction vessels.

In a particularly preferable arrangement, the wash plate is configured so that it is useful in delivering fluids to open ends of reaction vessels that are arranged in a two-dimensional array, e.g., an array having a spacing of reaction vessels corresponding to the spacing of wells of a standard 96-well microtiter plate. More specifically, such a plate includes an array of raised regions on the bottom surface, with each raised region being sized to engage one of the open ends of the reaction vessels. Further, each raised region includes one of the liquid delivery orifices and one of the gas delivery orifices. In this way, when the bottom of the wash plate is placed against the reaction vessel block, the raised regions are inserted into the open ends of the vessels to allow liquids or gases to be introduced into the reaction vessels.

In one particular aspect, the raised regions are cylindrical in geometry, and a gasket is disposed about each raised region. In this manner, the raised regions are configured to be conveniently inserted into cylindrical reaction vessels. In another aspect, the plate further includes a plurality of through holes through which an injection needle may be inserted. The through holes are aligned with the array of raised regions so that each reaction vessel may receive the injection needle when inserted through the through hole.

Conveniently, a tip may be operably attached to each of the fluid delivery orifices. Preferably, each of the liquid transport channels has a length and cross-sectional area which produces a flow resistance value that is less than a flow resistance value produced by all of the tips which are in communication with the transport channel. In this way, the flow of liquid through the transport channels will not be limited by use of the tips.

In yet another aspect, the plate may be constructed of a top member, a bottom member and a gasket disposed between the top member and the bottom member. Further, the liquid transport channels and the gas transport channels may be formed in separate planes, with the planes being spaced apart from each other.

In one exemplary embodiment, the invention provides a method for synthesizing chemical compounds onto solid supports using a wash plate. According to the method, solid supports are introduced into an array of reaction vessels, with each reaction vessel having an open end. A solution containing a chemical building block is contacted with the solid supports under conditions effective to react the building block with the solid support or with another building block. The solution is drained from the reaction vessels and the reaction vessels are washed using a wash plate that has been positioned on top the reaction vessels. The wash plate has a port and a plurality of fluid delivery orifices in communication with the port. The fluid delivery orifices are aligned with the reaction vessels so that the reaction vessels may be washed by introducing a washing solution through the port. The steps of contacting a solution with the supports, draining the solution from the reaction vessels and washing the reaction vessels is repeated until the chemical compounds are synthesized.

Optionally, the plate may be provided with a plurality of gas delivery orifices so that a gas may be introduced to the reaction vessels through the gas delivery orifices. In another alternative, the plate may further include a plurality of through holes to allow an injection needle to be inserted into one or more of the through holes so that a reagent may be injected into the reaction vessels.

The invention further provides an exemplary chemical synthesizing device which comprises a housing having a base and sides which define an interior. A reaction vessel block having a plurality of reaction vessels is disposed in the interior of the housing. A gasket is attached to the base in a manner such that the gasket and the base form a cavity. A vacuum source is provided to create a vacuum within the cavity such that the housing may be secured to an operating surface by the vacuum within the cavity. In this way, the synthesizing device may be securely attached to an operating surface during use.

The manner of vacuum attachment is particularly advantageous when the synthesizing device further includes a mixing apparatus which agitates the reaction vessel block to mix chemicals within the reaction vessels. For example, the synthesizing device may include a vortexing motor which agitates the reaction vessel block. Use of the vacuum secures the synthesizing device to the operating surface to prevent movement of the synthesizing device operation during operation of the motor.

In one particular aspect, the synthesizing device further includes a controller which is configured to periodically actuate and stop the mixing apparatus. In this way, the life of the mixing apparatus may be prolonged.

In still yet another embodiment, the invention provides a chemical synthesizing device which comprises a housing and a reaction vessel block that is disposed within an interior of the housing. The reaction vessel block includes a plurality of reaction vessels which are adapted to hold solid supports. A plurality of Peltier devices are in thermal communication with the reaction vessel block to heat or cool the reaction vessel block. A heat exchange member is in thermal communication with the Peltier devices to remove heat from the Peltier devices. In this way, a convenient way is provided to add heat to or remove heat from the reaction vessels during a synthesizing procedure.

Preferably, the heat exchange member includes at least one channel which is adapted to receive a thermally conductive medium. In one aspect, a flow regulator is provided to regulate the flow of the thermally conductive medium through the channel. In this way, the amount of heat removed from the reaction vessel block can be controlled. In yet another aspect, a thermocouple is disposed to measure the temperature of the thermally conducted medium, and a controller is coupled to the thermocouple. In this manner, the controller may be configured to stop operation of the Peltier devices if the temperature measured by the thermocouple exceeds a predetermined level. Hence, if the temperature becomes too great, the Peltier devices may be shut down to prevent overheating of the devices. In still yet another aspect, a timer is provided to control the amount of time in which the Peltier devices are actuated.

In one particularly preferable aspect, a source of pressurized gas is provided to supply a pressurized gas to an open bottom end of the reaction vessels. In this way, liquids may be held within the reaction vessels by the pressurized gas. Conveniently, a switch may be provided to control the release of the pressurized gas from the gas source, and a pressure gauge may be provided to monitor the pressure of the gas supplied to the reaction vessels. Preferably, the pressure gauge is configured to be placed in communication with the released gas only when the switch is actuated to allow the gas to be released from the source. Further, a pressure regulator may be provided to regulate the flow of gas released from the pressurized gas source.

In still another aspect, the source of pressurized gas is configured to selectively supply gas to the interior of the housing. In this way, an inert atmosphere is provided within the housing. Further, the source of pressurized gas may be configured to selectively supply gas across a top end of the reaction block to provide an inert atmosphere above the reaction vessels.

In yet another aspect, a vacuum source is provided so that a vacuum may be created at the bottom end of the reaction vessels to drain liquids from the reaction vessels. A switch may optionally be provided to control operation of the vacuum source. A vacuum gauge may also be provided to monitor the pressure created by the vacuum source, with the vacuum gauge being configured to be actuated only when the switch is actuated to allow a vacuum to be created within the reaction vessels.

Also included in the invention is a reaction vessel block comprising (i) an array of tubular reaction vessels, each vessel having an upper portion terminating in an open top end and a lower portion terminating in an open bottom end, (ii) a condenser having an array of condenser holes spaced to correspond to the array of reaction vessels, a (iii) reactor having an array of reactor holes spaced to correspond to the array of reaction vessels, and (iv) a spacer effective to separate the condenser from the reactor by a gap, wherein the array of reaction vessels is arranged so that the upper portions extend through the array of condenser holes, the lower portions extend through the array of reactor holes, and the reaction vessels span the gap. In a preferred embodiment, each reaction vessel has a frit disposed near the open bottom end to retain solid supports in the reaction vessels.

In still another aspect, the invention includes a chemical synthesizer comprising the reaction vessel block described above. In one embodiment, the synthesizer further includes a means of cooling the condenser (e.g., with circulating coolant such as cold water) and a means for heating the reactor (e.g., using Peltier devices). In a related embodiment, the synthesizer further includes a means for cooling the reactor (e.g., using Peltier devices). In still another embodiment, the synthesizer further includes a manifold effective to provide a vacuum or positive pressure to the open bottom ends. In a related embodiment, the manifold includes an opening to drain fluids filtered from reagent-containing reaction vessels. In yet another embodiment, the reaction vessel block is mounted on an intermediate plate, the plate containing at least three intermediate holes, and the synthesizer further including (i) a base plate having at least three base holes spaced to correspond to the intermediate holes, (ii) at least three rods having off-center pins, each rod being rotatably inserted into one of the at least three base holes and each off-center pin being inserted into one of the three intermediate holes, and (iii) a motor effective to rotate at least one of the rods, wherein operation of the motor is effective to vortex (move in a circular motion) the reaction vessel block. In a preferred embodiment, the intermediate and base plates each include four holes. In another preferred embodiment, the synthesizer further includes a means (e.g., a belt) to drive each of the rods.

DETAILED DESCRIPTION OF THE SPECIFIC EMBODIMENTS

The invention provides exemplary chemical synthesizers and methods for their use. The synthesizer of the invention includes various improvements to the chemical synthesizers described in co-pending U.S. application Ser. Nos. 08/736,317, filed Oct. 23, 1996, and 08/947,476, filed Oct. 10, 1997, previously incorporated herein by reference.

Figure 1A:
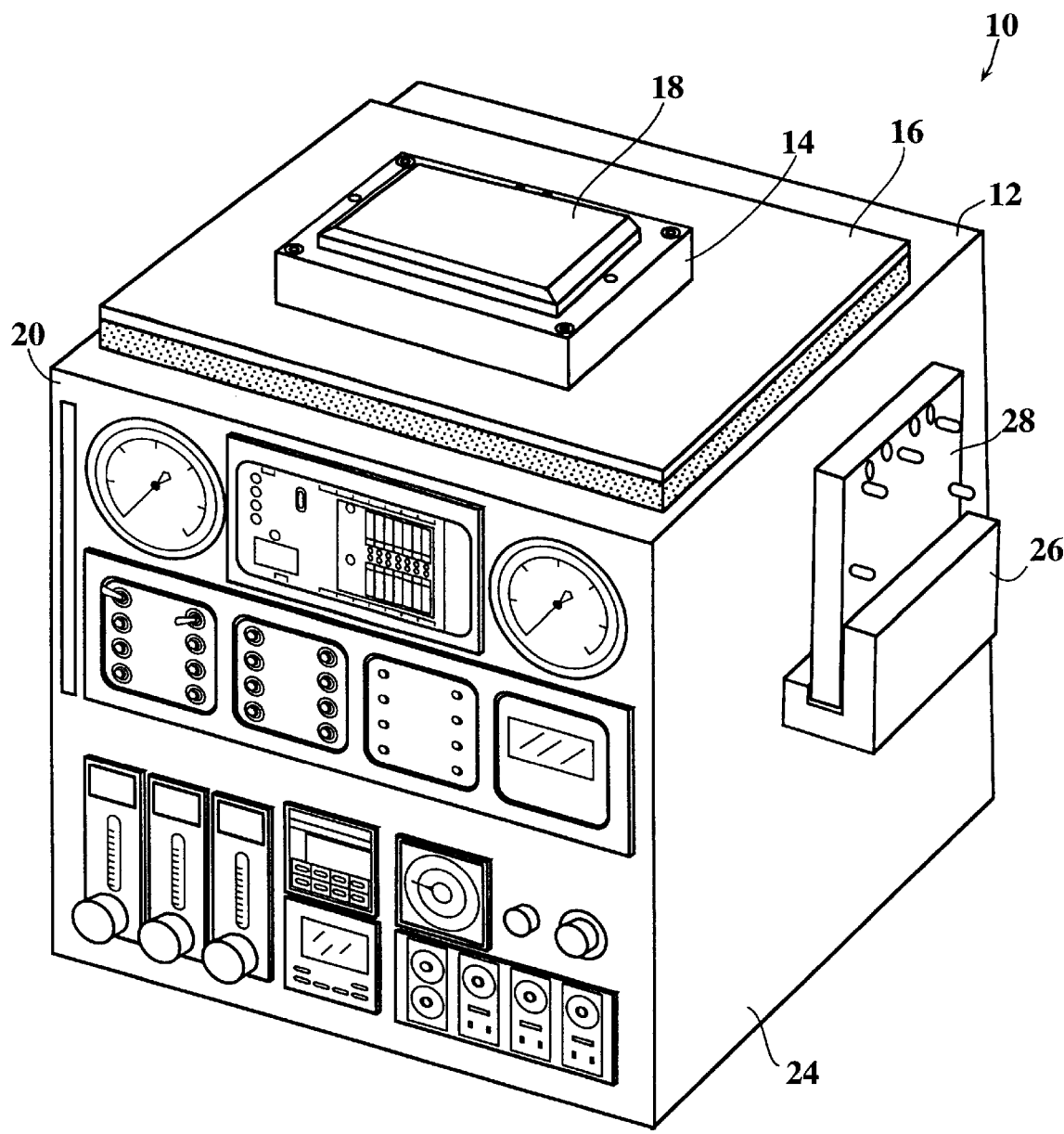
FIG. 1A is a front perspective view of an exemplary chemical synthesizer according to the invention.
Figure 1B:
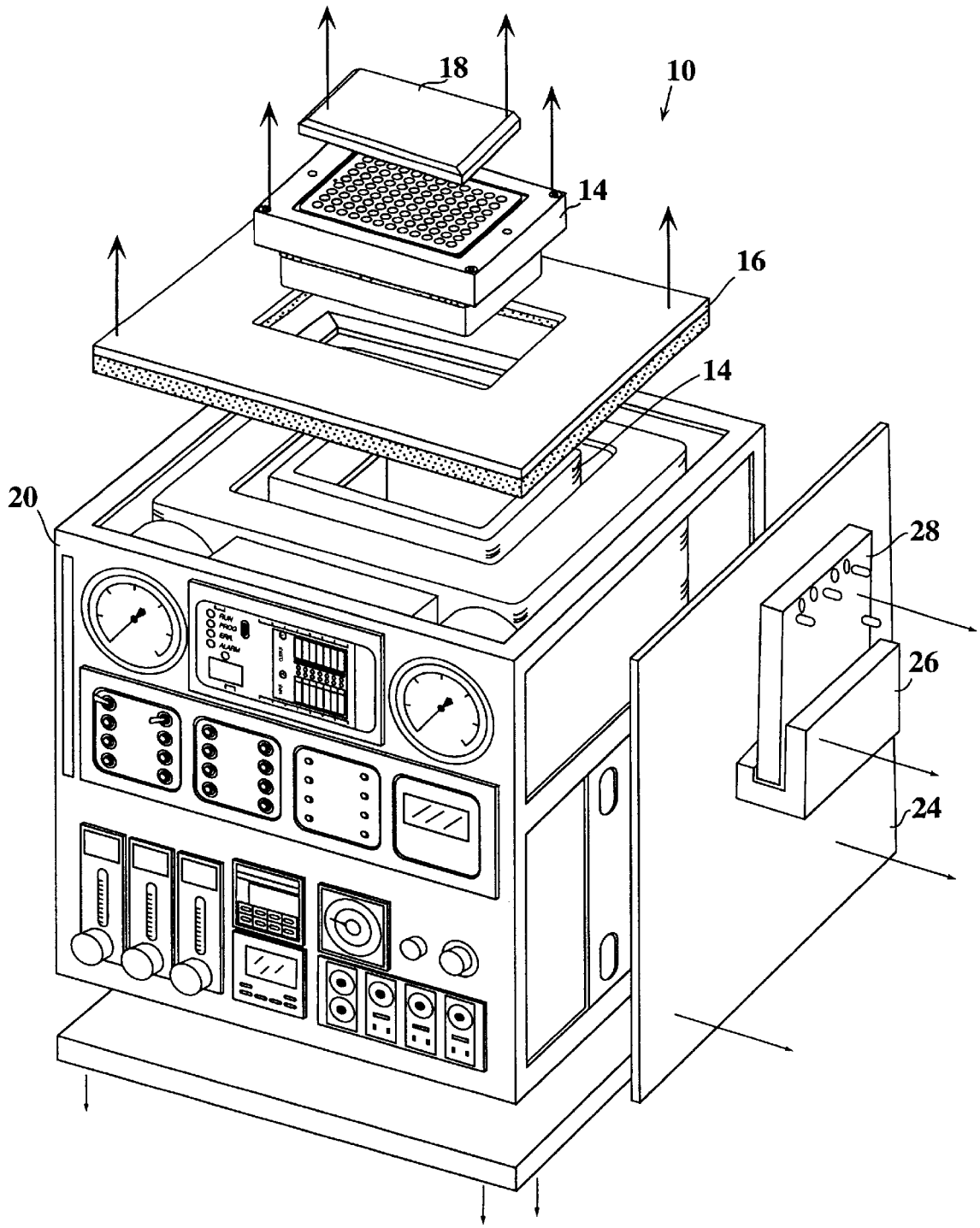
FIG. 1B is an exploded front perspective view of the chemical synthesizer shown in FIG. 1A.

Referring now to FIGS. 1A and 1B, an exemplary embodiment of a chemical synthesizer will be described. Synthesizer 10 comprises a housing 12 which is configured to hold a reaction vessel block assembly 14, shown partly covered (in FIG. 1A) by a cover 16 and a lid 18. Reaction vessel block assembly 14 includes components used to synthesize various chemical compounds onto solid supports as described in greater detail hereinafter. The main components of reaction vessel block assembly 14 will be described schematically hereinafter with reference to FIG. 5.

Figure 3:
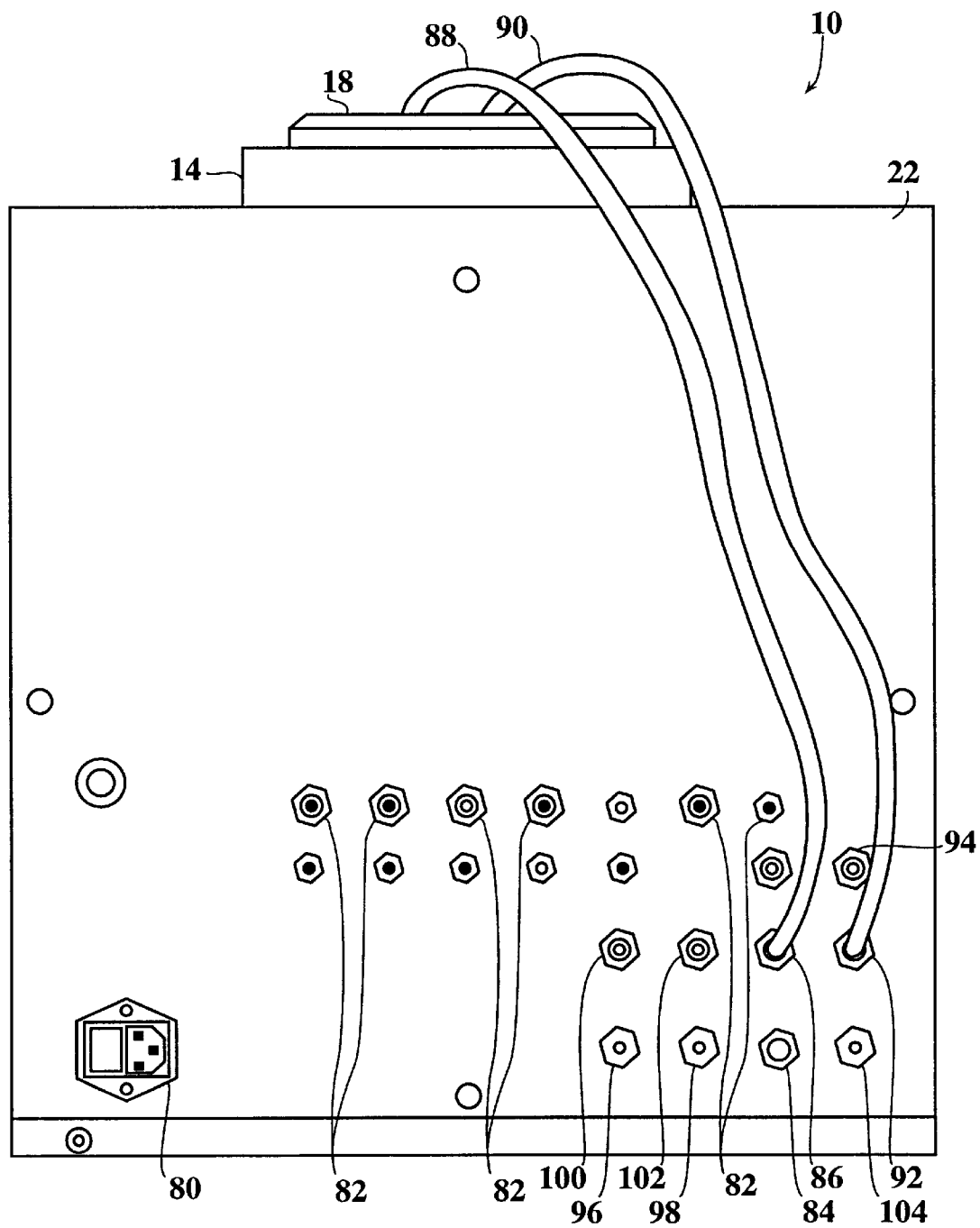
FIG. 3 is a rear view of the synthesizer of FIGS. 1A and 1B.

Synthesizer 10 includes a front panel 20 and a back panel 22 (see FIG. 3). Front panel 20 includes various gauges, controls, switches, and the like for operating synthesizer 10 and will be described in greater detail hereinafter. Coupled to a side 24 of synthesizer 10 is a holder 26. Removably held within holder 26 is a wash plate 28 which may be placed on top of reaction vessel block assembly 14 (after removing cover plate 18) to facilitate the synthesizing process as described in greater detail hereinafter.

Figure 2:
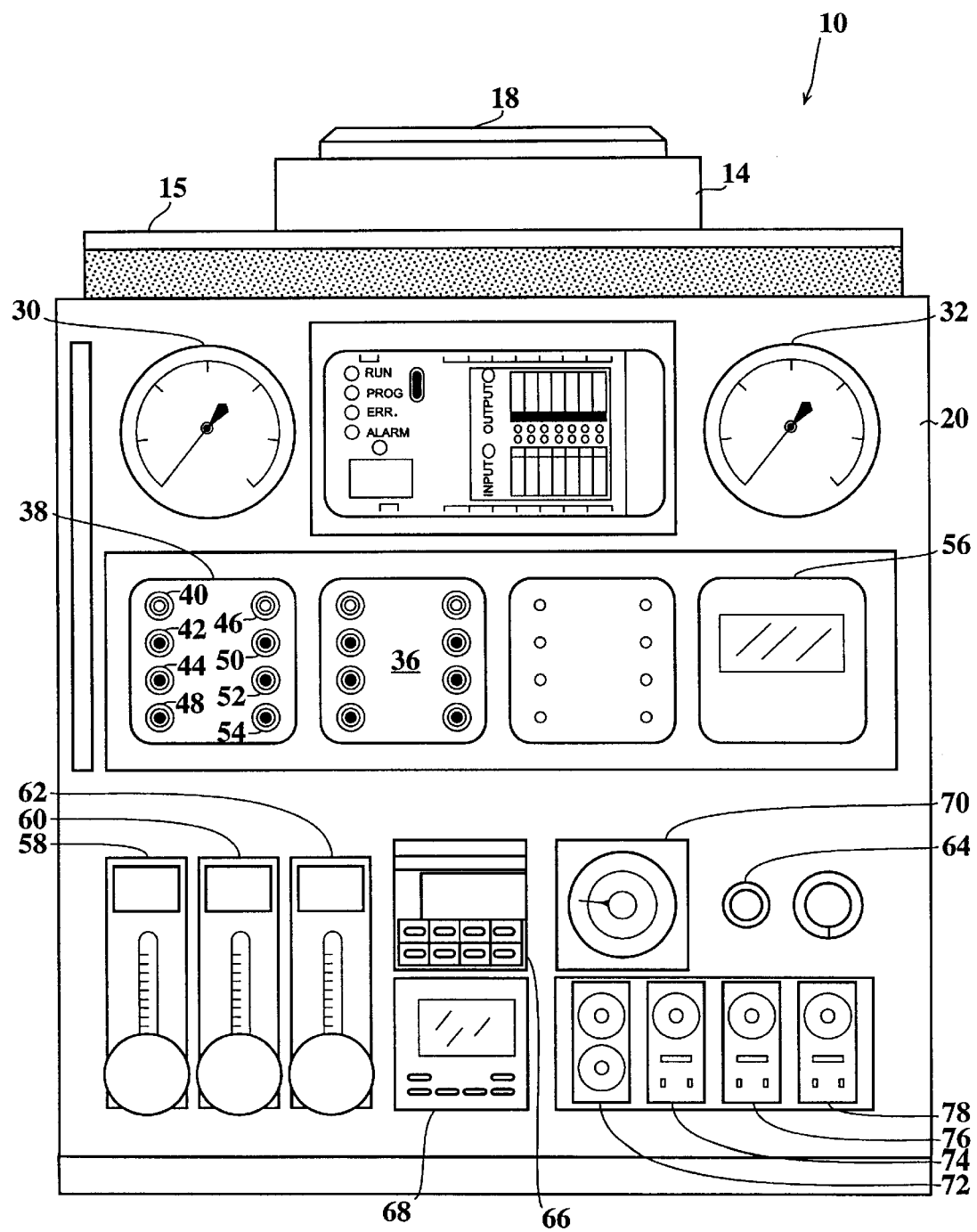
FIG. 2 is a front view of the synthesizer of FIGS. 1A and 1B.

Referring now to FIG. 2, the various components on front panel 20 will be briefly described. Front panel 20 includes a vacuum gauge 30 to monitor the vacuum at the bottom of a reactor of reaction vessel block assembly 14. A pressure gauge 32 is provided to monitor the positive pressure at the bottom of the reactor in reaction vessel block assembly 14. Disposed between gauges 30 and 32 is a programmable controller 34 and serves as the main controller for controlling the operation of the various components of the chemical synthesizer 10. A key panel 36 is included to allow for convenient programming of controller 34.

Adjacent key panel 36 is a switch panel 38 which includes various switches used during the synthesizing process. For example, switch panel 38 includes a filtration/argon plug toggle switch 40 for switching the chemical synthesizer between a filtration mode and an argon plug mode where various fluids are held within the reaction vessels of reactor vessel block assembly 14. A gauge push-button switch 42 is provided to allow for activation of either vacuum gauge 30 or pressure gauge 32. Below gauge push-button switch 42 is an optional argon to bottles push-button switch 44. A heating/cooling toggle switch 46 is included to either heat or cool the reactor vessel block in assembly 14. An activation push-button switch 48 is employed to activate the heating and cooling process. A condenser water push-button switch 50 is optionally provided to allow for water to be supplied to a condenser (described below) to assist in the process of condensing vapors escaping from the reaction vessels of assembly 14. A fill/empty push-button switch 52 controls the filling and emptying of a waste collector which receives waste fluids from reaction vessel block assembly 14. Finally, a reserve push-button switch 54 is included to accommodate for the addition of other components to synthesizer 10.

Front panel 20 may optionally include a vacuum gauge 56 to monitor the vacuum at the bottom of synthesizer 10. As described in greater detail hereinafter, such a vacuum is employed to hold synthesizer 10 to an operating surface. Further included on front panel 20 are three flow regulators 58, 60 and 62. Flow regulator 58 is provided to monitor and adjust the rate of argon flowing to cover plate 18. Flow regulator 60 is provided to vent a selected flow of argon inside the housing of synthesizer 10 to minimize condensation on cooled surfaces, thereby reducing the potential for water and/or oxidation damage to sensitive components (e.g., electronic components). In turn, pressure regulator 64 allows for the adjustment of positive pressure at the bottom of the reaction vessel block in assembly 14. Finally, flow regulator 62 allows for the monitoring and adjustment of the rate of water flowing through a conduit or "cooling plate" (see FIG. 6) used to add or remove heat from Peltier devices under assembly 14.

A temperature controller 66 is included to protect Peltier devices which are included within assembly 14 from overheating. Another temperature controller 68 is provided to monitor and adjust the temperature of the reaction vessel block in assembly 14. A timer 70 allows for the setting of a heating or cooling period for the reaction vessel block of assembly 14.

Front panel 20 further includes a set of timers 72, 74, 76 and 78. Timer 72 is a repeat cycle timer to set a time for operating a vortex motor as described in greater detail hereinafter. Timer 74 is an interval timer which may be operated to prevent operation of a vacuum during a waste cycle. Timer 76 is a delay-on-make timer which provides a delay before an inert gas (e.g., argon) is delivered to assembly 14. Finally, timer 78 is a delay-on-make timer which allows a period to be set for removing the filtrate liquid from synthesizer 10.

Referring now to FIG. 3, configuration of back panel 22 will be described. Back panel 22 includes a power connector 80 to which a standard 110 volt power cord may be connected to supply power to synthesizer 10. A plurality of washing system valves 82 may optionally be provided to facilitate the transport of various fluids to wash plate 28 (see FIGS. 1A and 1B). In such a case, valves 82 would be coupled by tubes to wash plate 28. In this manner, various fluids introduced into synthesizer 10 could be selectively channeled through valves 82 and delivered to wash plate 28.

A water-in valve 84 is provided to allow a water source to be coupled to synthesizer 10. The water introduced through valve 84 is supplied to a cooling plate (see FIG. 6) within assembly 14 to cool the reaction vessels. Optionally, some of the water introduced through valve 84 may be routed to a water-in valve 86, through tubing 88 and to the condenser inside reaction vessel block assembly 14. In this way, cooling water may be provided to the condenser. After passing through the condenser, the water passes into tubing 90 and through a water-out valve 92. A main water-out valve 94 is provided to allow for the removal of water introduced through water-in valve 84.

A vacuum valve 96 allows a vacuum source (not shown) to be coupled to synthesizer 10 to allow fluids to be filtered from the reaction vessel block of assembly 14 as described in greater detail hereinafter. A positive pressure or argon valve 98 allows for a source of positive pressure, such as argon, to be coupled to synthesizer 10. The argon is employed both to hold liquids within the reaction vessels of assembly 14 and to supply a blanket of inert gas over the top of the reaction vessel block of assembly 14, as described in greater detail hereinafter. A portion of the vacuum supplied at vacuum valve 96 may also be employed to produce a vacuum within a waste collector (not shown), as described in greater detail hereinafter. Conveniently, a valve 100 is included on back panel 22 to control the vacuum at the waste collector. Similarly, a portion of the argon supplied through argon valve 98 may be employed to provide argon to the waste collector. A valve 102 is employed to control the amount of positive pressure at the waste collector. A waste valve 104 is included to allow waste fluids to be evacuated from synthesizer 10 and distributed to the waste collector, as described hereinafter.

Figure 4:
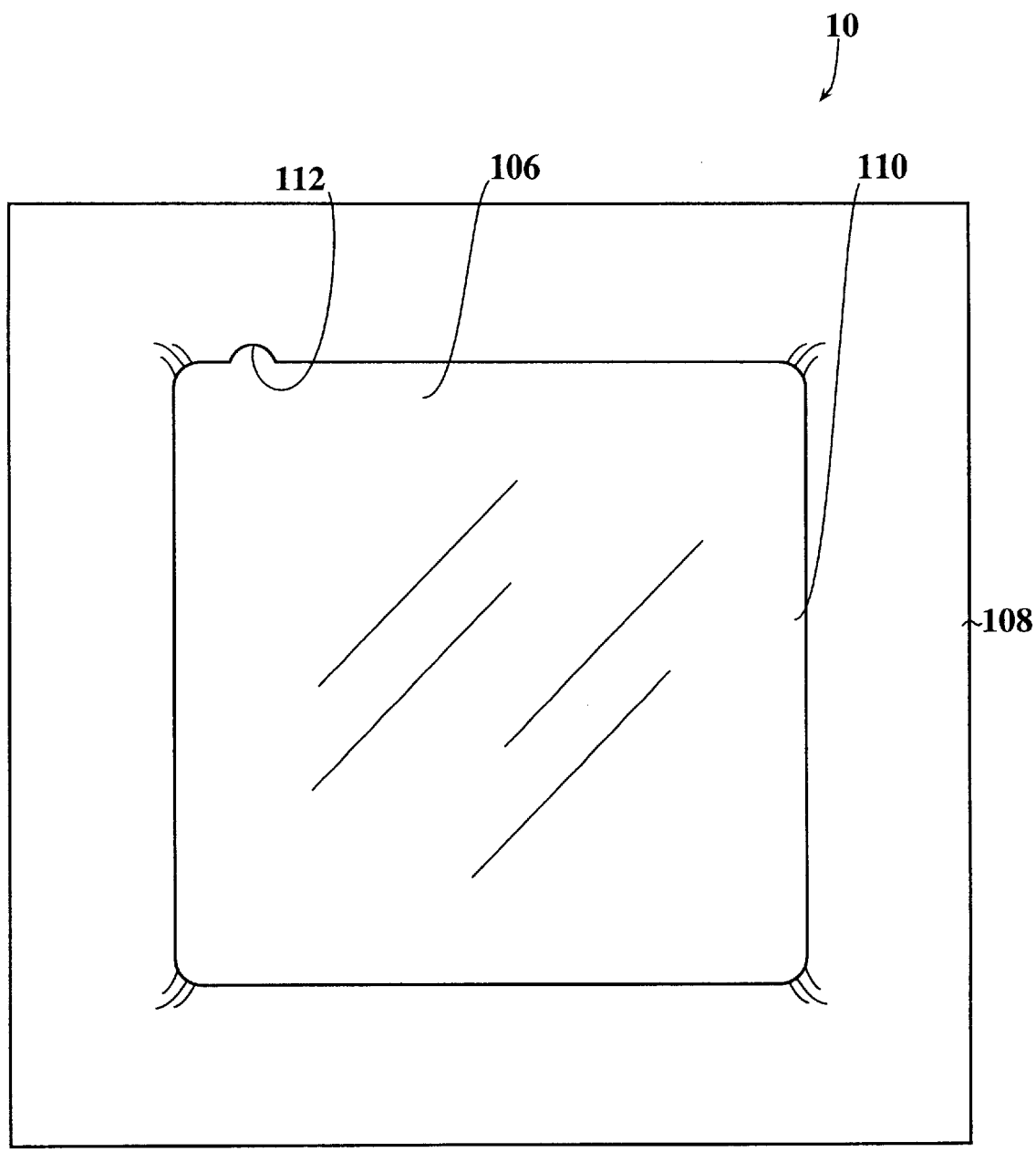
FIG. 4 is a bottom view of the synthesizer of FIGS. 1A and 1B.

Referring now to FIG. 4, a bottom end 106 of synthesizer 10 will be described. Bottom end 106 is provided with a resilient gasket 108 which interfaces with a surface upon which synthesizer 10 is placed during operation. Gasket 108 forms a cavity 110 in which a vacuum may be created by coupling a vacuum source to cavity 110 through a passage 112 extending through gasket 108. In this way, synthesizer 10 may be secured to an operating surface by creating a vacuum within cavity 110. As described hereinafter, a vortexing motor (not shown) will preferably be employed to circularly mix assembly 14 during a synthesizing process. By securely attaching synthesizer 10 to an operating surface using a vacuum, synthesizer 10 will not move around during operation of the vortexing motor. Exemplary materials that may be used to construct gasket 108 include rubbers, flexible plastics, and the like. As previously described, vacuum gauge 56 (see FIG. 2) may optionally be employed to monitor the amount of vacuum within cavity 110.

Figure 5A:
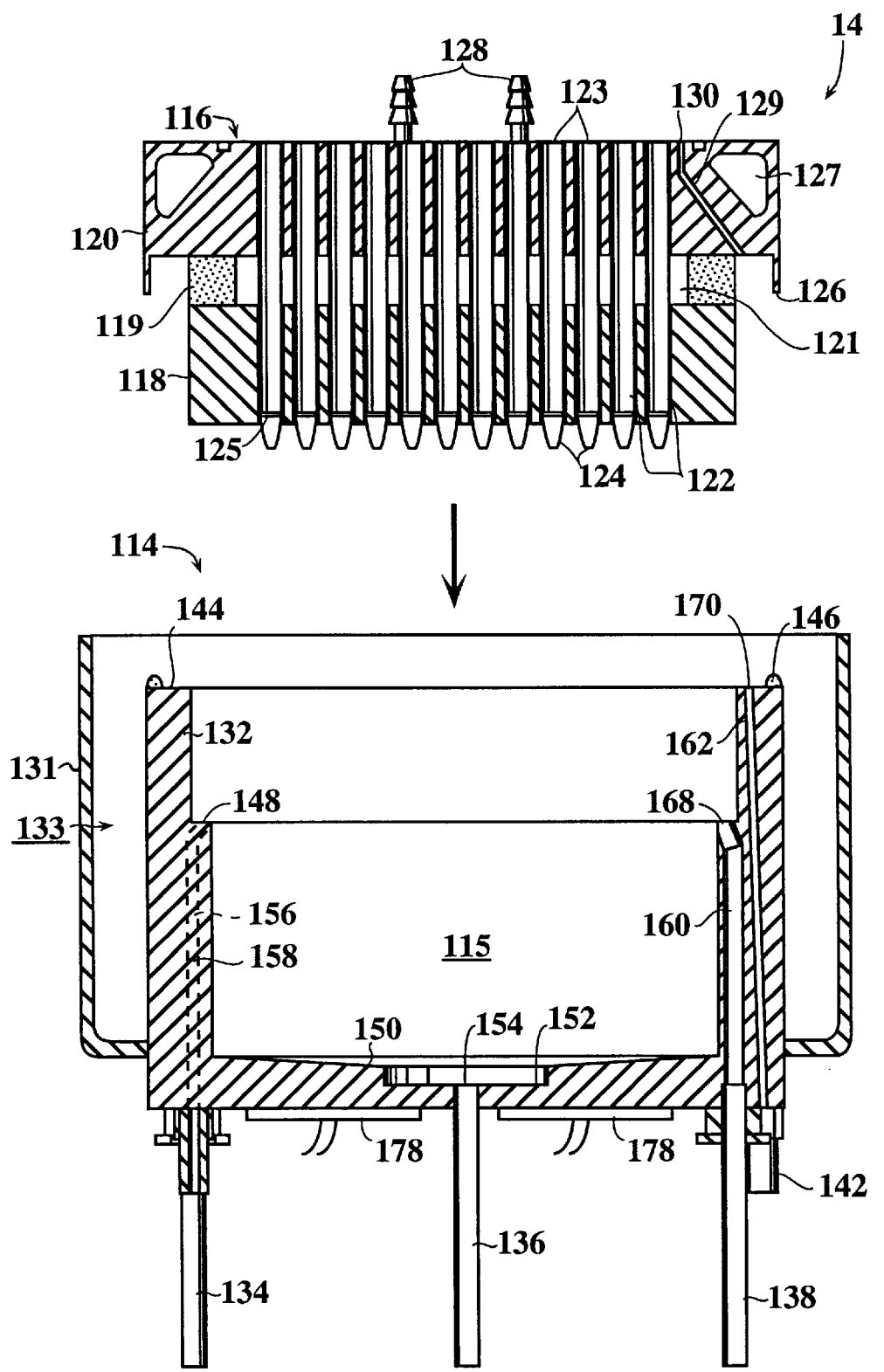
FIG. 5A is a schematic cross-sectional side view of a reaction vessel block assembly of the synthesizer of FIGS. 1A and 1B.
Figure 5B:
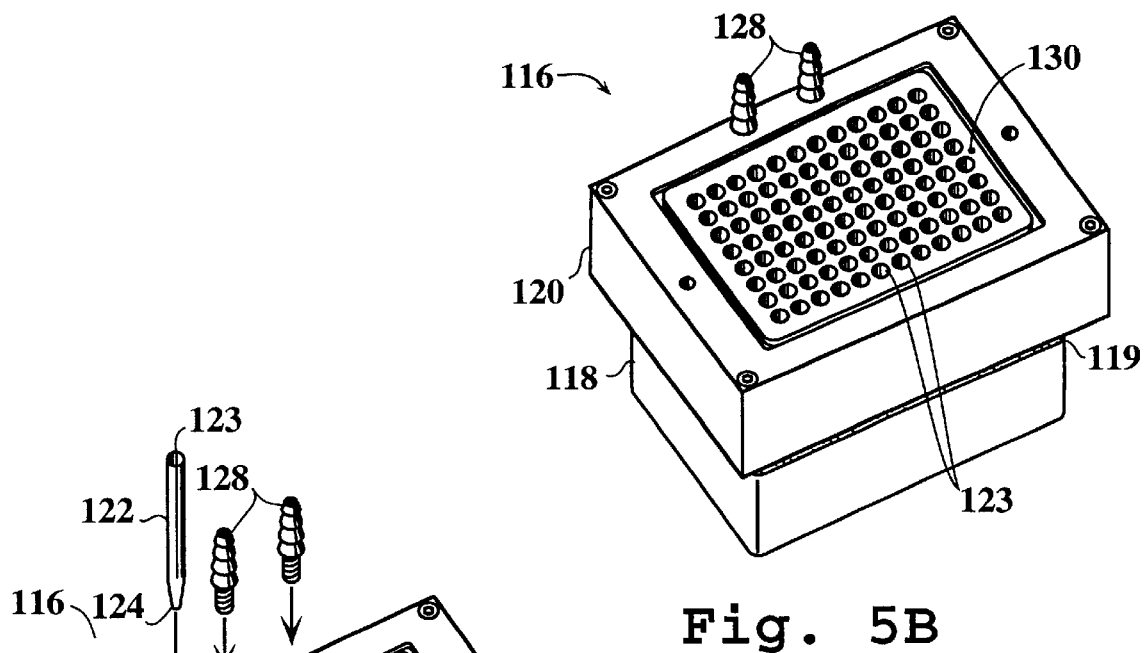
FIG. 5B is a top perspective view of a reaction vessel block according to the invention.
Figure 5C:
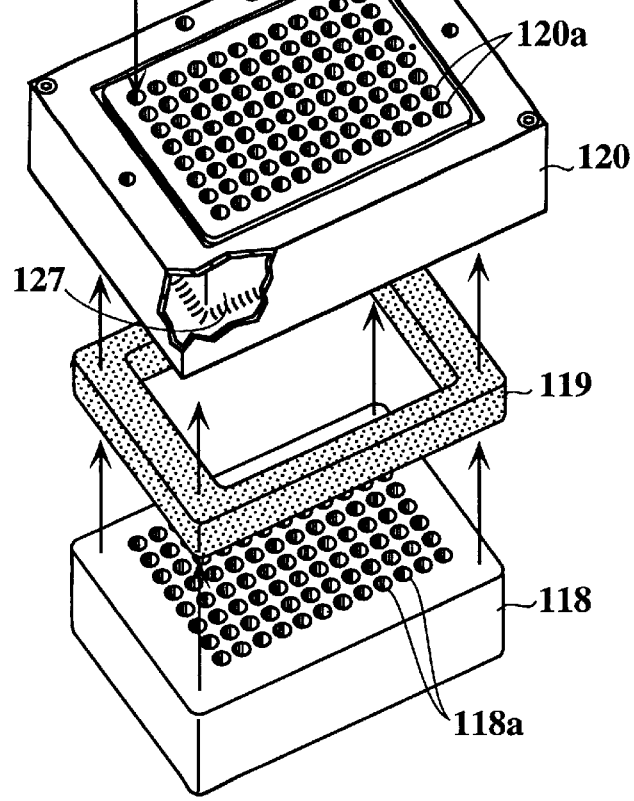
FIG. 5C is an exploded and cut-away top perspective view of the reaction vessel block of FIG. 5B.

Referring now to FIGS. 5A–5F, reaction vessel block assembly 14 will be described. Assembly 14 comprises a base member 114 into which a reaction vessel block 116 is received. As best seen in FIGS. 5A, 5B and 5C, reaction vessel block 116 includes a reactor 118, a condenser 120, a spacer 119 which creates an air-filled cavity 121 between reactor 118 and condenser 120, and a plurality of reaction vessels 122. Reactor 118 and condenser 120 contain a plurality of through holes 118a and 120a, respectively, which are arranged in an array (e.g., a standard 96-well plate array) and into which reaction vessels 122 are inserted. Reaction vessels 122 each have a top end 123 and bottom end terminating in a small aperture 124. Reaction vessels 122 extend through condenser 120, space 121, and through reactor 118, such that top ends 123 of reaction vessels 122 are flush with the top surface of condenser 120, and apertures 124 protrude slightly from the bottom surface of reactor 118. Reaction vessels 122 are preferably made of "Teflon" (PTFE), and may contain frits 125 to retain solid supports suspended therein.

Condenser 120 includes an overhang edge 126, a water channel 127, and hose attachments 128. In this way, a chilled fluid such as chilled water may be circulated through channel 127 via hoses 88 and 90 (FIG. 3) attached to hose attachments 128, to cool condenser 120 (and consequently cool the upper portions of reaction vessels 122 that are in contact with condenser 120) to condense reactant vapors in the upper portions of reaction vessels 122 back into the lower portions of reaction vessels 122. Condenser 120 also includes a channel 129 terminating in an opening 130.

Figure 5D:
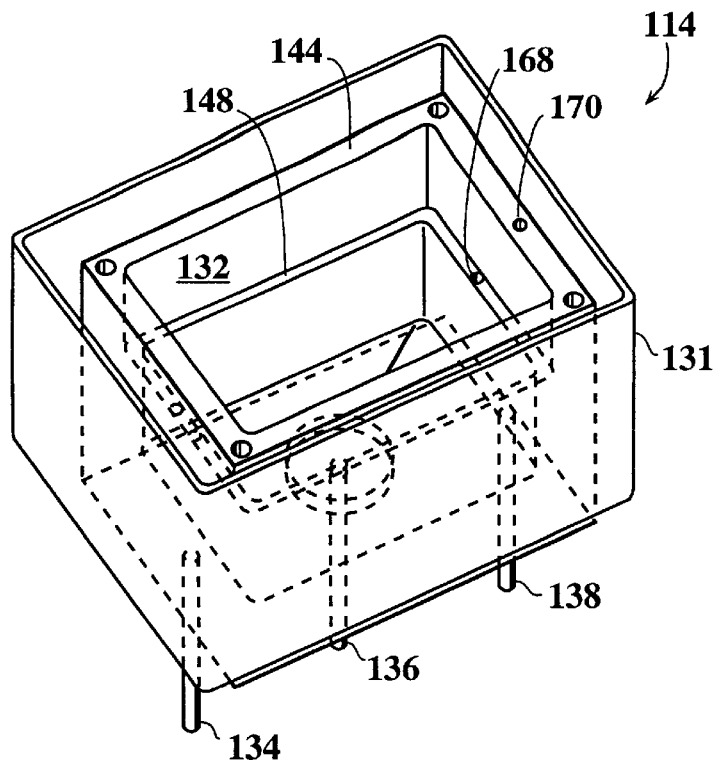
FIG. 5D is top perspective view of a base member in accordance with the invention.
Figure 5E:
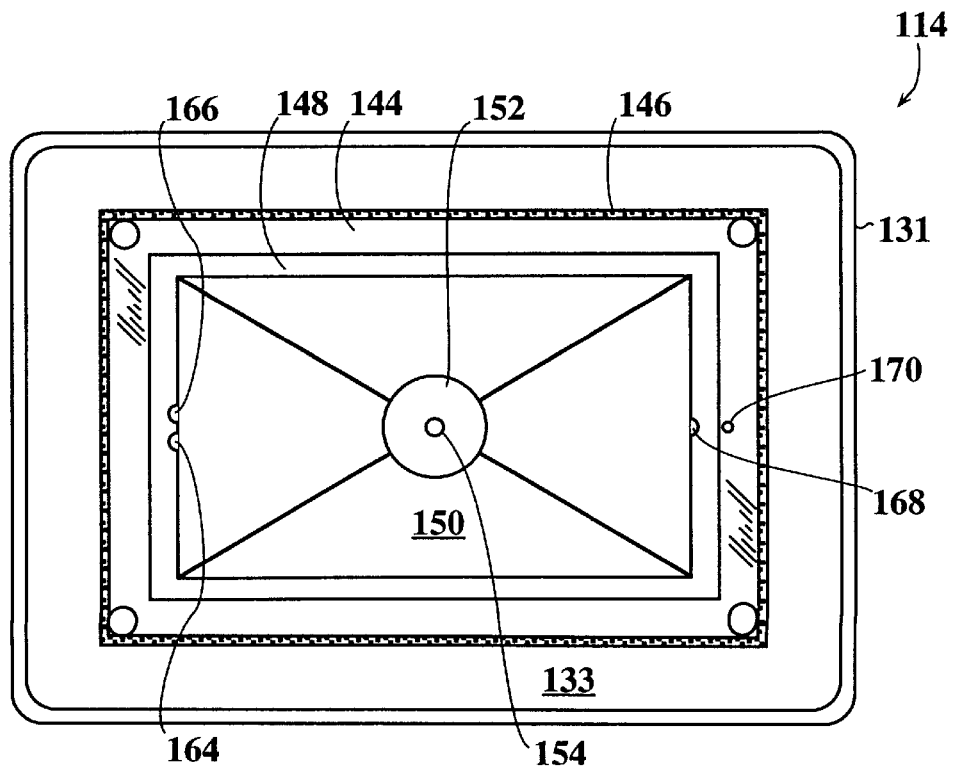
FIG. 5E is top view of the base member of FIG. 5D.
Figure 5F:
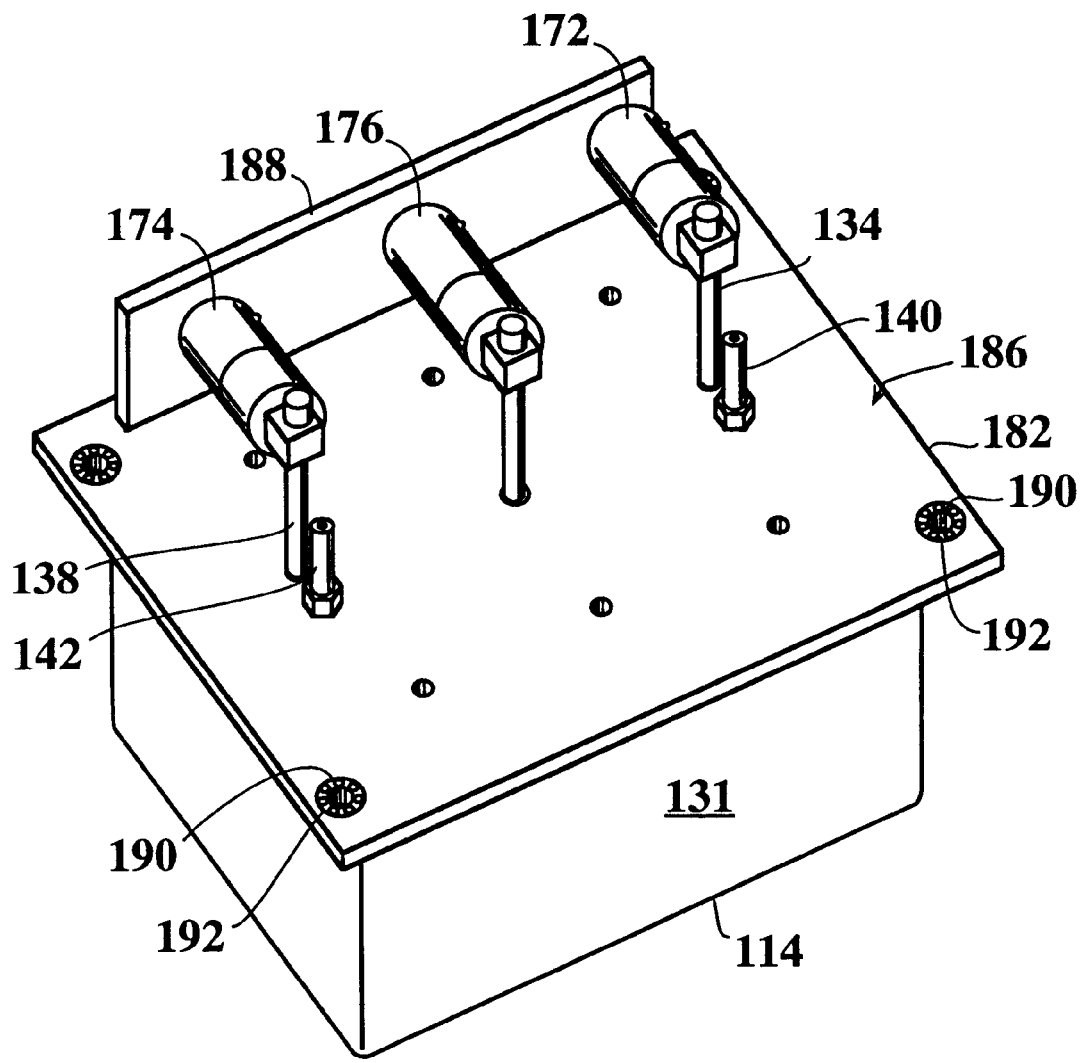
FIG. 5F is bottom perspective view of a base member with an intermediate plate and valves attached according to the invention.

As best seen in FIGS. 5A, 5D and 5E, base member 114 includes a jacket 131, a block retainer 132, three coupling tubes 134, 136 and 138, and two coupling connectors 140 and 142 (see also FIG. 5F). An enclosure 133, conveniently formed between jacket 131 and block retainer 132, may optionally contain a heat transfer medium useful for heating or cooling block retainer 132 (and thus heating or cooling reactor 118 when reactor 118 is engaged with block retainer 132). Exemplary heat transfer media include slurries of dry ice and a suitable solvent, such as ethanol; ice water; resistive heating elements and the like. Block retainer 132 includes an upper edge 144 (onto which is seated a gasket 146), a lip 148, and a tapered bottom 150. Centered in bottom 150 is a fluid collector 152 having an opening 154 for draining fluids collected in fluid collector 152.

Block retainer 132 further includes channels 156, 158, 160 and 162, which are in fluid communication with coupling tube 134, coupling connector 140, coupling tube 138 and coupling connector 142, respectively. Channels 156, 158 and 160 terminate in openings 164, 166 and 168, respectively, in lip 148. Channel 162 terminates in hole 170 in upper edge 144, and is used for carrying a gas, e.g., an inert gas such as argon or nitrogen, from connector 142 to hole 170. The gas escapes from hole 170 and (when condenser 120 is engaged with reactor 118) enters channel 129 in condenser 120 to exit from opening 130 and provide a blanket of gas (preferably inert gas) over tops 123 of reaction vessels 122. Cover 18 may be placed over reaction vessel block 116 to maintain an inert atmosphere over tops ends 123 of reaction vessels 122.

When synthesizer 10 is used to carry out a chemical synthesis, reaction vessel block 116 is inserted into base member 114 to form reaction vessel block assembly 14. When engaged in this manner, the sides of reactor 118 contact the upper inside surface of block retainer 132, while the bottom lateral edge of reactor 118 rests on lip 148. A small gap remains between overhang edge 126 and upper edge 144. This gap is preferably sealed by gasket 146 to form a gas-tight seal that facilitates transfer of gas from hole 170 into channel 129. Further, thermal coupling is established between block retainer 132 and reactor 118, to facilitate efficient transfer of heat between block retainer 132 and reactor 118 (and thus reaction vessels 122). Additionally, this configuration thermally insulates reactor 118 from condenser 120, so that, for example, bottom portion can be heated to heat contents of reaction vessels while condenser 120 is being cooled to condense reaction vapors back into reaction vessels 122. Thermal insulation is preferably wrapped around base member 114 to thermally insulate reactor 118 (and to some extent condenser 120)

The combination of reaction vessel block 116 and base member 114 also define a manifold 115, which enables application of positive or negative pressure to reaction vessels 122 via apertures 124. Preferably, apertures 124 have a size range from about 0.1 mm to about 2 mm to allow fluids to be maintained within reaction vessels 122 by application of positive pressure within manifold 115. Positive pressure is applied through valve 174, which connects coupling tube 138, channel 160, and opening 168 with a source of pressurized (e.g., 15 psi) inert gas, such as argon or nitrogen. The pressure inside manifold 115 may be maintained at a selected level with the assistance of a pressure regulator and a pressure and/or vacuum gauge, as described below. The pressure and/or vacuum gauge may be conveniently connected to coupling connector 140 (which is in fluid communication with channel 158 and opening 166) to measure pressure inside manifold 115. In this way, fluids may be held within reaction vessels 122 by application of positive pressure to reactor 118 similar to the embodiments describing co-pending U.S. application Ser. No. 08/947,476, filed Oct. 10, 1997, previously incorporated by reference. A low pressure may be selected to just maintain fluids in the reaction vessels, while higher pressures may be used to cause bubbling of the gas up through the reaction vessels and their contents. The latter approach enhances mixing within the reaction vessels and may be used to create an inert atmosphere above the reaction vessels. Of course, one can also use the above-described procedure to introduce a gas that is not inert, but that is a reactant or catalyst to the reactions being carried out in the reaction vessels.

A vacuum may be applied to manifold 115 via valve 172 (FIG. 5F), which connects a vacuum source (e.g., −25" Hg) to coupling tube 134, channel 156 and opening 164. In this way, a vacuum created within manifold 115 facilitates draining of fluids from reaction vessels 122 and into tapered bottom end 150 and fluid collector 152. Openings 164, 166 and 168 are located vertically above tapered bottom end 150 to allow manipulation and measurement of pressure within manifold 115 without hindrance from the draining fluids which accumulate within fluid collector 152. In this way, a high vacuum may be used to drain reaction vessels 122 into fluid collector 152. The accumulated fluids may then be drained as desired through opening 154 into coupling tube 136 by opening a valve 176. The draining of fluids may be facilitated by applying a vacuum to the drain line, and/or creating positive pressure (with inert gas as described above) in manifold 115.

As mentioned above, base member 114 can include a jacket 131 for use in heating or cooling reactor 118 of reaction vessel block 116. Such heating and cooling may also be achieved, however, using other devices to heat or cool reactor 118. For example, as is best seen in FIG. 5A, Peltier devices 178 may be provided at the bottom of base member 114. As electrical current is passed through devices 178, heat is added to or removed from base member 114 to raise or lower the temperature, depending on the polarity of the current. Through both conductive and radiation heat transfer, reaction vessel block 116 is then heated or cooled, thereby heating or cooling reagents within reaction vessels 122.

When block retainer 132 is cooled, heat may be removed from the back sides of Peltier devices 178 by employing a coolant, such as water, which is circulated through a conduit (not shown) adjacent Peltier devices 178 opposite block retainer 132. Preferably, use of Peltier devices 178 will allow block retainer 132 to be cooled to a temperature in the range from about 20° C. to about −20° C. During a heating process, devices 178 will preferably heat block retainer 132 to a temperature in the range from about 20° C. to about 95° C., and the conduit will contain a fluid to supply heat to the back sides of the Peltier devices. The conduit is illustrated schematically as a "cooling plate" in FIG. 6, along with a schematic depiction of the Peltier devices.

Figure 5G:
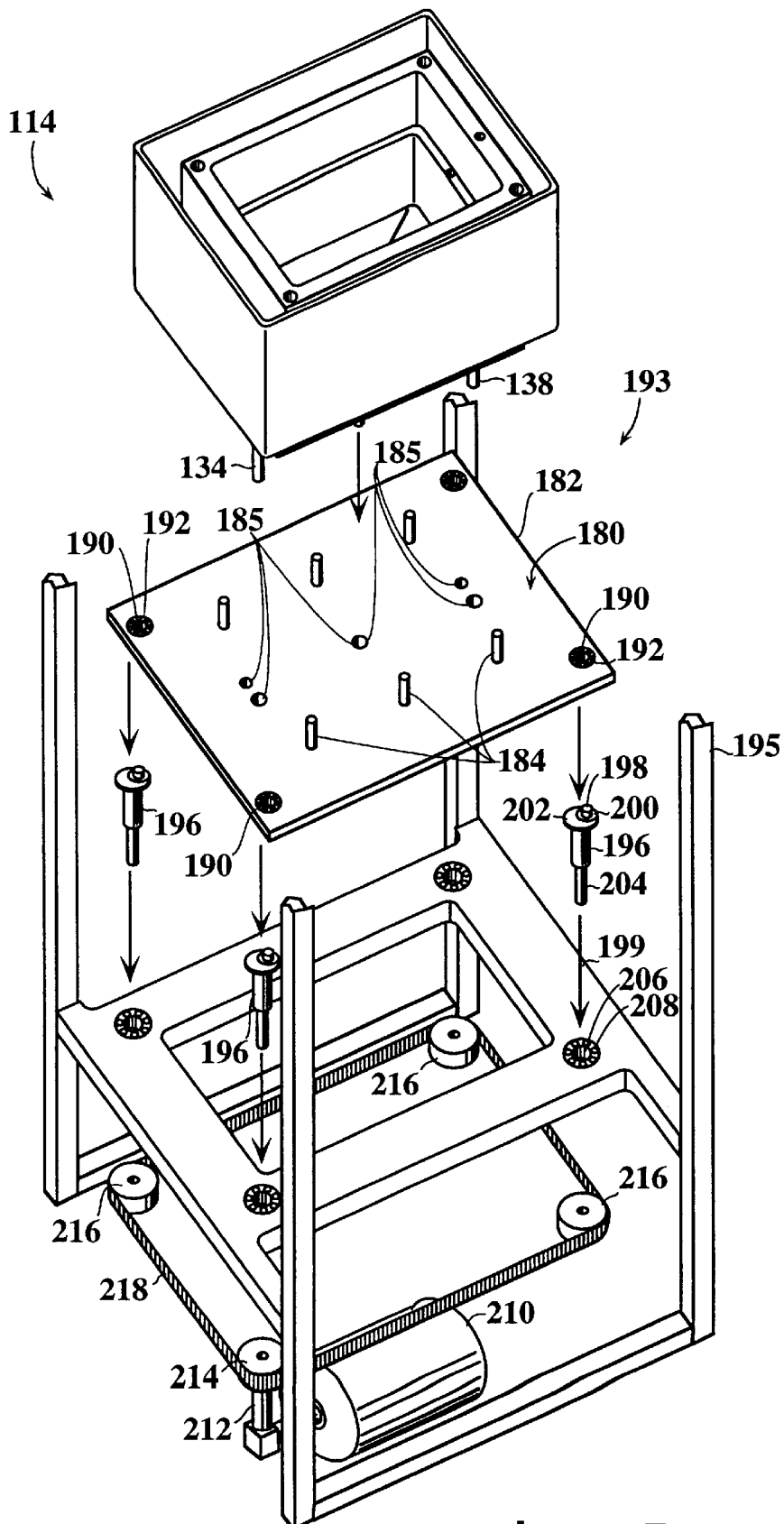
FIG. 5G is an exploded top perspective view of a vortexing subassembly constructed in accordance with the invention.

As best appreciated in FIGS. 5F and 5G, base member 114 is mounted to a top surface 180 of an intermediate plate 182 via six spacer bolts 184 (FIG. 5G). Coupling tubes 134, 136 and 138, as well as coupling connectors 140 and 142, protrude through holes 185 in intermediate plate 182. Attached to a bottom surface 186 of intermediate plate 182 is a valve bracket 188 for holding valves 172, 174 and 176. Intermediate plate 182 also includes four small holes 190, each with a small circular bearing 192.

FIG. 5G shows a vortexing subassembly 193, which includes intermediate plate 182 and a base plate 194. Intermediate plate 182 is mounted onto base plate 194 (secured to a synthesizer frame 195) by way of four rods 196, each of which has at one end an off-center pin 198, an off-center flange 200, and a centered flange 202; and at the other end a shaft 204. Each off center pin 198 engages a corresponding small hole 184 in intermediate plate 182, such that intermediate plate is supported by the four off-center flanges 200, which ride on small circular bearings 192. Each rod in turn extends through one of four large holes 206 in base plate 194, each large hole having a large circular bearing 208, such that each centered flange 202 rides on a corresponding large circular bearing 208.

Also part of vortexing subassembly 193 is a vortexing motor 210, mounted at the bottom of the synthesizer for agitating reaction vessel block 116 during synthesis. Motor 210 includes an upright shaft 212 that engages a belt pulley 214. In turn, belt pulley 214 engages shaft 202 of the corresponding rod 196. Three other belt pulleys 216 are provided to engage shafts 202 of the other three rods 196. A belt 218 wraps around the four belt pulleys to provide power from motor 210 to all four rods 196.

Referring now to the schematics of FIGS. 6–8, operation of chemical synthesizer 10 will be described. For convenience of discussion, the same reference numerals used to describe synthesizer 10 will be included on the schematics of FIGS. 6–8. Although the discussion below provides specific times for the operation of various timers, it will be understood that these times are provided simply for illustration, and are not to be construed as limiting in any way.

Figure 6:
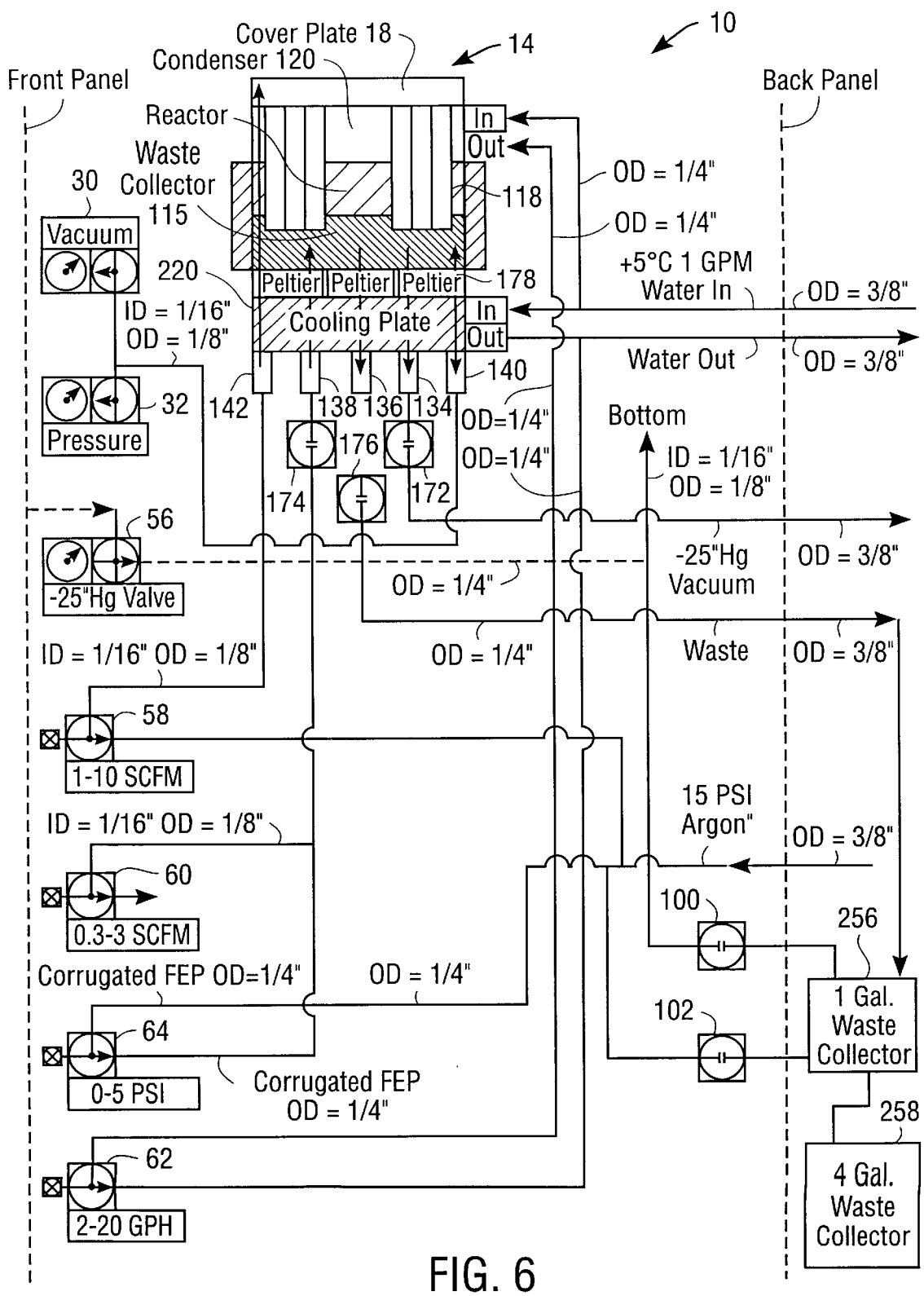
FIG. 6 is a schematic diagram showing various lines and gauges included in the synthesizer of FIGS. 1A and 1B according to the invention.

As shown in FIG. 6, vacuum gauge 30 and pressure gauge 32 are employed to measure the vacuum and positive pressure at the bottom of the reaction block in assembly 14. Vacuum gauge 56 is optionally provided to monitor the vacuum at the bottom of the synthesizer, i.e., when the synthesizer is suctioned to an operating surface. Flow regulator 58 is provided to monitor and adjust the argon flow rate through the cover place of assembly 14. Flow regulator 60 is provided to provide a regulated flow of argon inside the housing of synthesizer 10 to minimize condensation on cooled surfaces, thereby reducing the potential for water and/or oxidation damage to sensitive components (e.g., electronic components). In turn, pressure regulator 64 allows for the adjustment of positive pressure at the bottom of the reaction vessel block in assembly 14. Finally, flow regulator 62 allows for the monitoring and adjustment of the rate of water flowing through a conduit or "cooling plate" 220 used to add or remove heat from Peltier devices under assembly 14.

As described above, synthesizer 10 includes three valves 174, 176 and 172. Valve 174 controls the application of positive pressure to the bottom of the reactor in assembly 14 via coupling tube 138. Valve 172 controls the application of a vacuum to manifold 115 in assembly 14 via coupling tube 134. Finally, valve 176 controls the flow of waste from fluid collector 152 of assembly 14 (i.e., from the manifold) to a one-gallon waste collector 256. A four-gallon waste collector 258 is provided to receive the contents of one-gallon waste collector 256, as described hereinafter. Valve 100 is provided to control the vacuum at the one-gallon waste collector 256 while valve 102 controls the positive pressure of one-gallon waste collector 256.

In operation, filtration/argon plug toggle switch 40 (see FIG. 2) is switched to the argon plug position, opening valve 174 (after a brief delay) to allow argon gas to be supplied to the bottom of the reactor in assembly 14. Optionally, pressure regulator 64 may be adjusted to alter the amount of positive pressure supplied to the reactor. Various reagents may then be placed into the reaction vessels, with the argon gas holding the reagents within the reaction vessels as described in co-pending U.S. application Ser. No. 08/947,476, filed Oct. 10, 1997, previously incorporated by reference.

Preferably, valve 174 will be delayed from opening for a predetermined period of time, e.g., about 5 seconds, as described below, to allow for equilibration following a vacuum in the manifold. When valve 174 opens, gauge push-button switch 42 (see FIGS. 2 and 7) can be used to activate pressure gauge 32, thereby allowing the amount of pressure supplied to the reaction vessels to be monitored. Valve 174 preferably remains open throughout the duration of the reaction.

Following completion of the reaction, the reagents within the reaction vessels are drained and the reaction vessels are washed. Draining of the reagents from the reaction vessels occurs by switching filtration/argon plug toggle switch 40 to the filtration position. Once switched to filtration, valve 172 is opened and valve 174 is closed. Valve 176 remains closed. Timers 74 and 76 (see FIG. 7) are also turned off. Upon opening of valve 172, a vacuum is created within the manifold of assembly 14 to drain the reagents from the reaction vessels and into fluid collector 152 (see FIG. 5A). Conveniently, vacuum gauge 30 may be operated to determine the amount of vacuum within the manifold. While draining the reagents, vortexing motor 210 (see FIG. 7) will be stopped by toggle switch 40 to prevent its operation during draining. Preferably, valve 172 will remain open for a time in the range of from about 15 to about 60 seconds (for some solvents. up to tens of minutes) to drain reagents from the reaction vessels into fluid collector 152

To drain the reagents from fluid collector 152 (FIG. 5A), valve 172 is closed and valve 176 is opened. Valve 174 remains closed. Valve 100 is also opened to supply a vacuum to one-gallon waste collector 256, so that the reagents drained from the waste collector are aspirated into one-gallon waste collector 256. Periodically, one-gallon waste collector 256 will fill and will need to be transferred to four-gallon waste collector 258. This is accomplished by closing valve 100 while opening valve 102. When valve 102 is opened, argon forces the waste liquid from one-gallon waste collector 256 to four-gallon waste collector 258. Although waste collectors 256 and 258 are described as being one-gallon and four-gallon, respectively, it will be appreciated that other sizes may be used, or that they may be combined into a single unit.

If it is desired to wash the reaction vessels, wash plate 28 (see FIG. 1) may be placed on the condenser of assembly 114 after the cover plate is removed. A washing solution may then be introduced into the reaction vessels. Optionally, washing system valves 82 (see FIG. 3) may be employed to supply washing solution to the wash plate. To remove the washing solution from assembly 14, valves 176 and 172 may be operated, as previously described, to remove the washing solution to 1-gallon waste collector 256.

Figure 7:
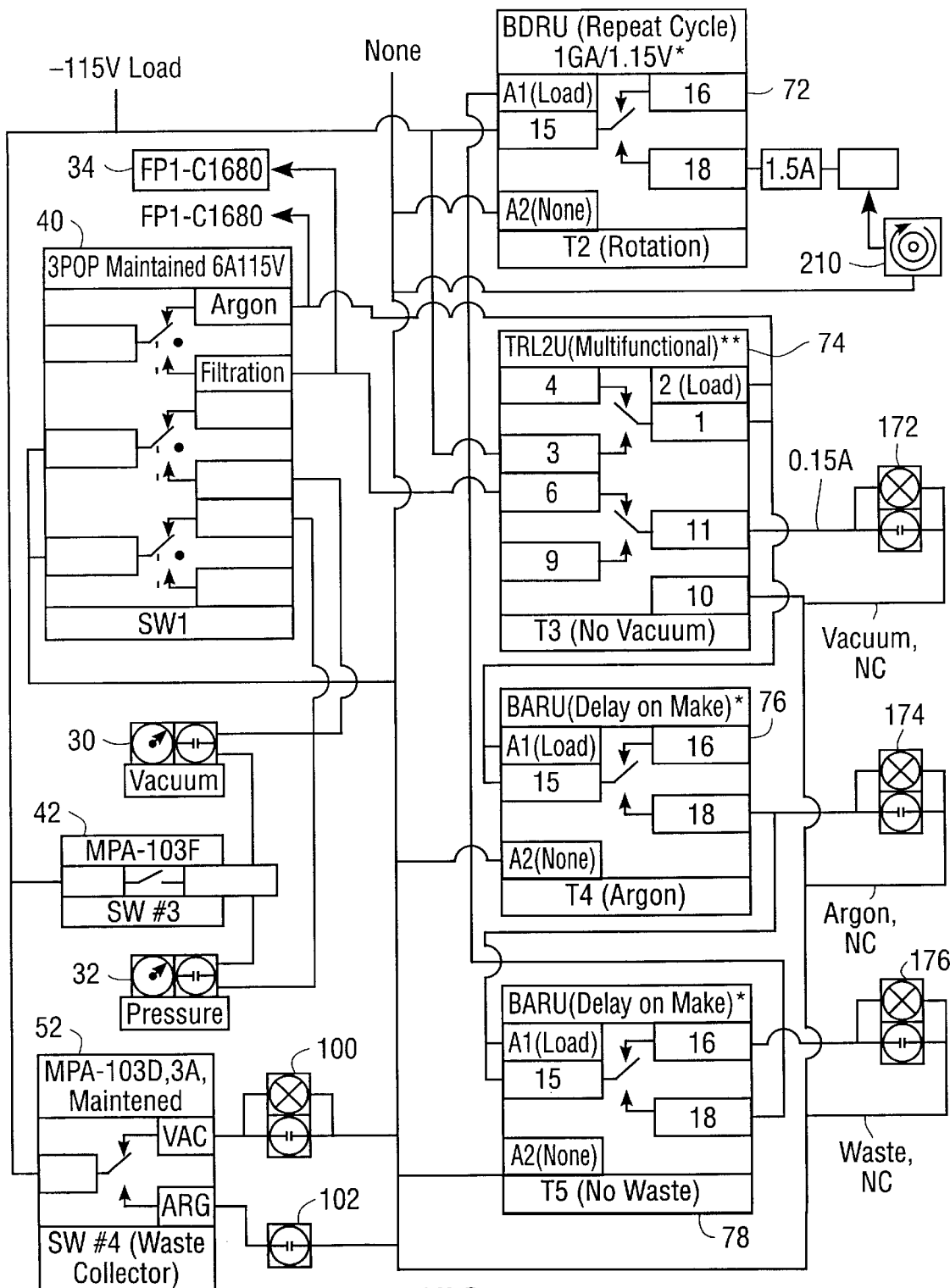
FIG. 7 is a schematic diagram showing the electrical circuitry and various valves of the synthesizer of FIGS. 1A and 1B according to the invention.

Referring now to FIG. 7, operation of the various valves and vortexing motor 210 will be described. As previously described, toggle switch 40 is turned to the argon position ("activated") to initiate pressurization of manifold 115 with argon to hold reagents within the reaction vessels. Activation of toggle switch 40 starts timer 74, which runs for 30 seconds, and sends a signal to delay-on timer 76. Approximately 5 seconds after toggle switch 40 is activated (to allow for pressure equilibration), timer 76 turns on, opening valve 174 to allow argon to flow into manifold 115. The on signal from timer 76 also signals timer 78 to deactivate vortexing motor 210 and open valve 176 to allow any fluid accumulated in fluid collector 152 to drain out. Approximately 30 seconds after toggle switch 40 is activated, timer 78 closes valve 176 and allows vortexing motor 210 to be operational. In this way, vortex motor 210 may then be used to agitate the reagents within the reaction vessels. Repeat cycle timer 72 is set to control both the time at which motor 210 is actuated and the delay between actuation times. It will be appreciated from the forgoing that once toggle switch 40 is activated (turned to the "argon" position) to begin pressurizing manifold 115, returning it to the "filtration" position has no effect for about 30 seconds.

When it is desired to drain the reagents from the reaction vessels, toggle switch 40 is switched to the filtration position as previously described. This opens valve 172 to drain the reagents into fluid collector 152, and turns off timers 74, 76 and 78, closing valve 174, and leaving valve 176 closed from the previous step. Toggle switch 40 also controls the ability of push-button switch 42 to use vacuum gauge 30 or pressure gauge 32 to assess the pressure inside manifold 115. When valve 172 is closed (i.e., when toggle switch 40 is not in the filtration position), activating toggle switch 40 allows the measurement of positive pressure using pressure gauge 32. However, when toggle switch 40 is placed in the filtration position such that valve 172 is open, toggle switch 40 signals pressure gauge to not respond to activation of push-button switch 42, thereby protecting pressure gauge 32 from exposure to potentially destructive negative pressure.

Valves 176 and 100 may then be opened to allow the filtrated waste to be removed into one-gallon waste collector 256. When ready to transfer waste from collector 256 to collector 258, push-button switch 52 is turned to the empty position to close valve 100 and open valve 102.

Figure 8:
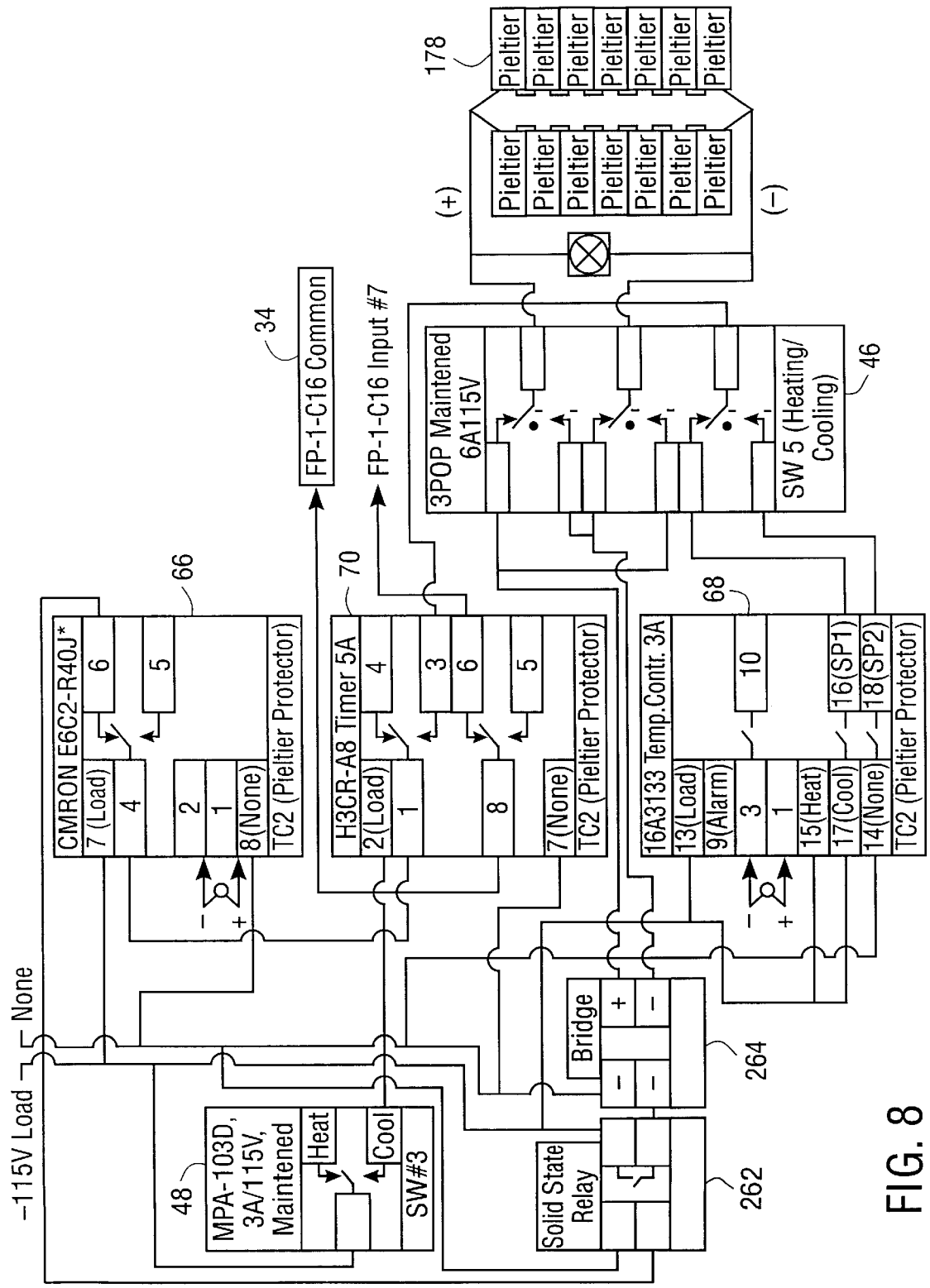
FIG. 8 is a schematic diagram of a heating and cooling system of the synthesizer of FIGS. 1A and 1B according to the invention.
Figure 9:
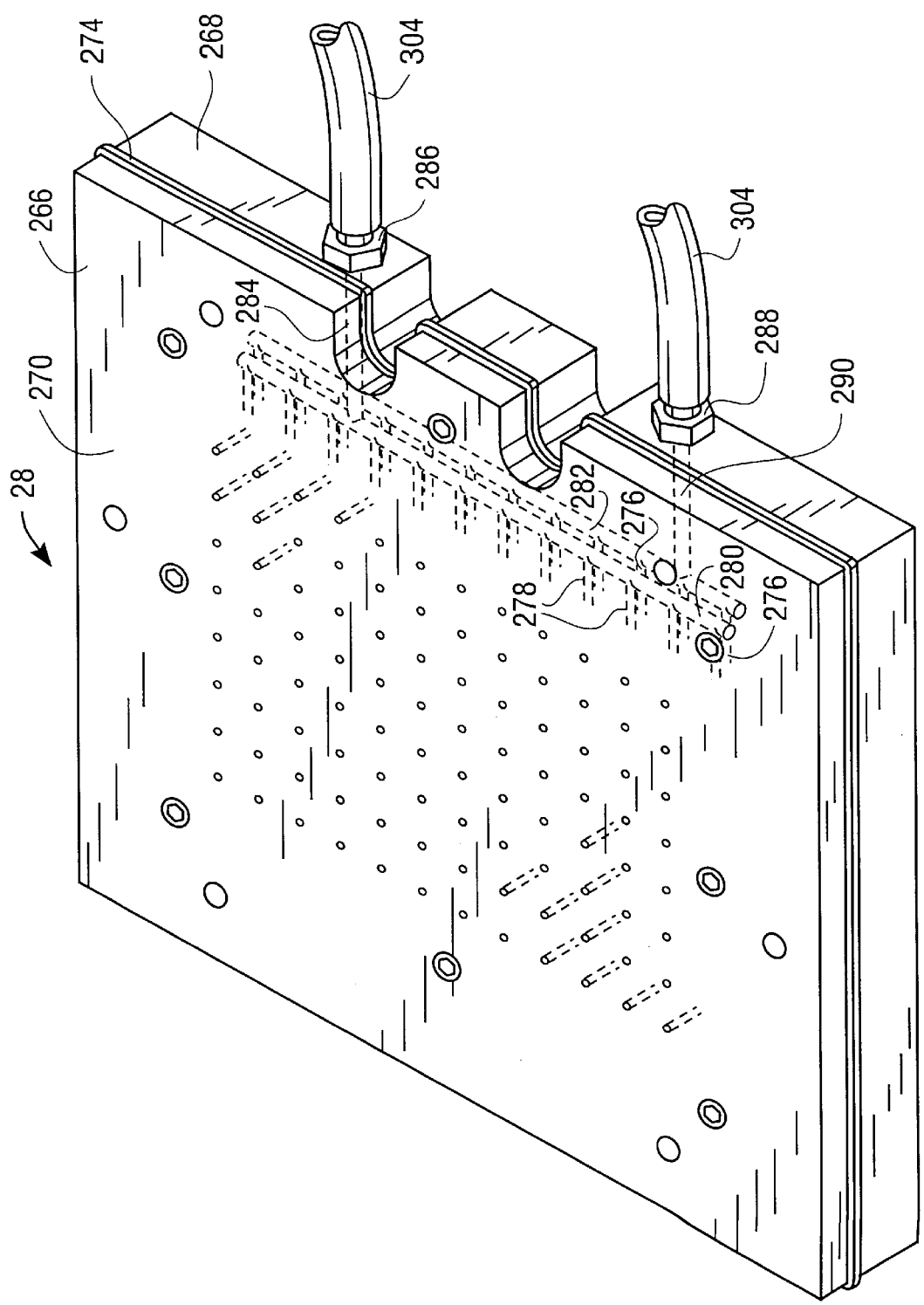
FIG. 9 is a top perspective view of an exemplary wash plate of the synthesizer of FIGS. 1A and 1B.
Figure 10:
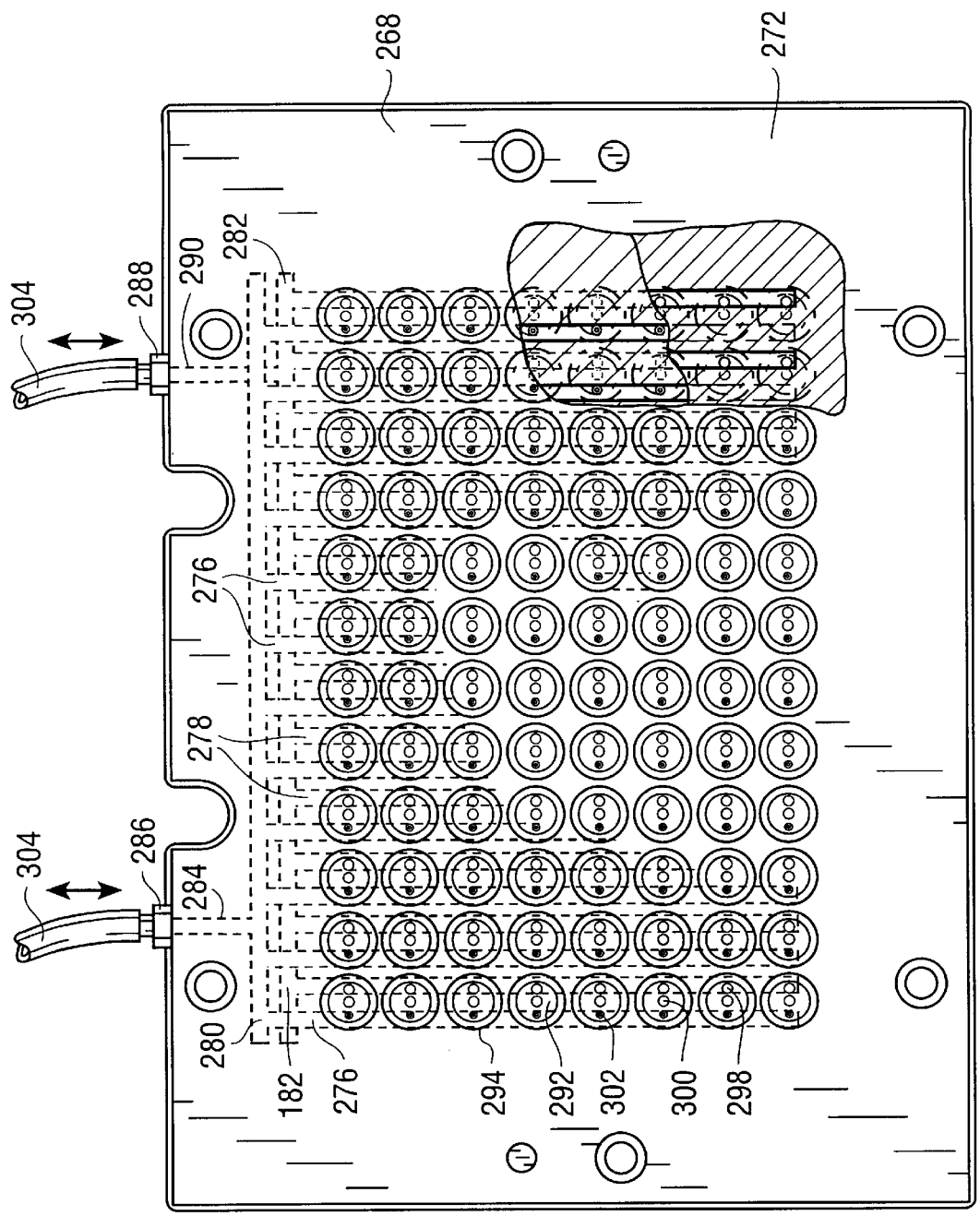
FIG. 10 is a bottom view of the wash plate of FIG. 9.
Figure 11:
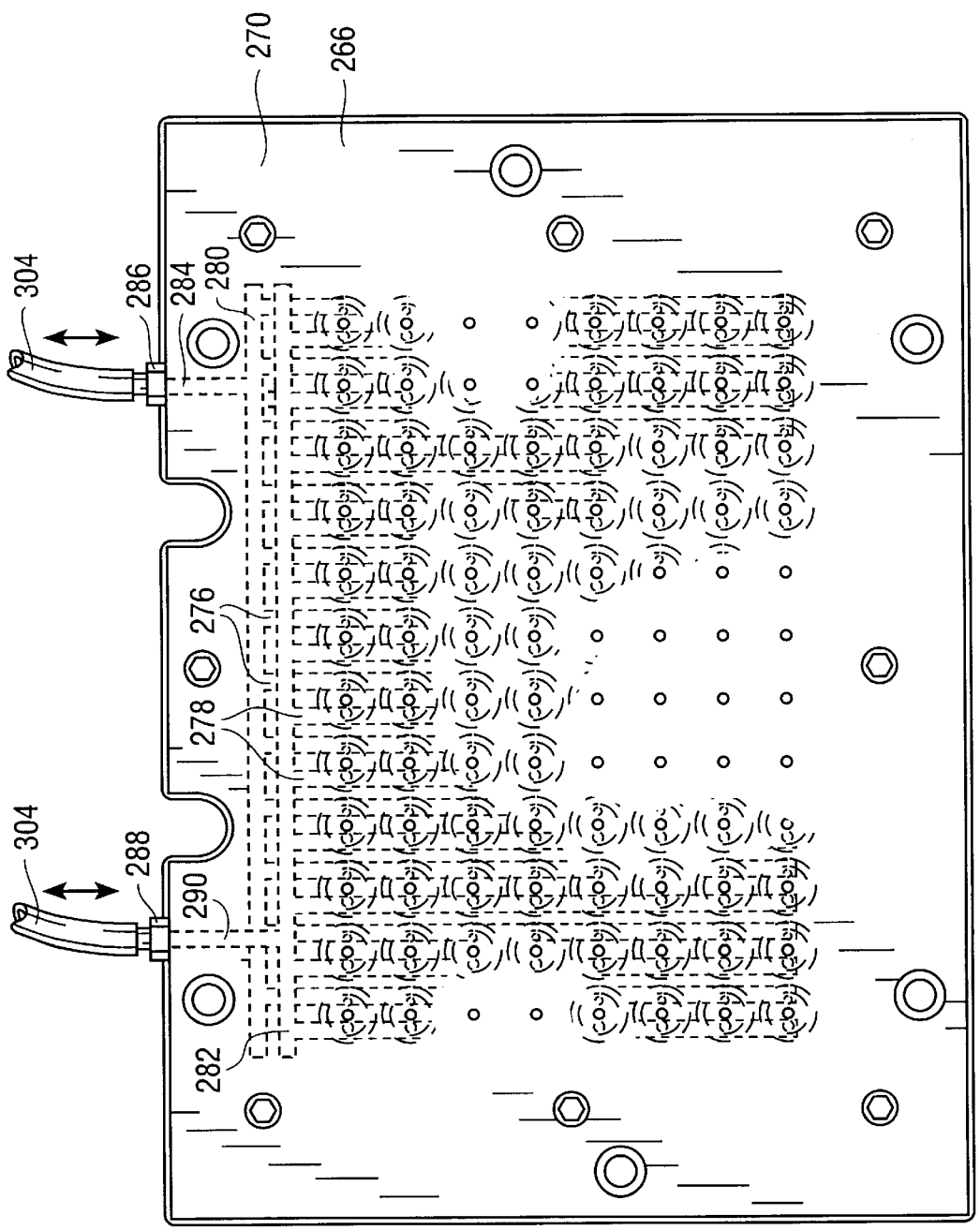
FIG. 11 is a top view of the wash plate of FIG. 9.

Referring to FIG. 8, heating and cooling of the reaction vessels during a synthesizing process will be described. As previously mentioned, activation push-button switch 48 is employed to activate the heating or cooling process. Timer 70 may be manually set to determine the amount of time during which heating or cooling will occur. When push-button switch 48 is actuated, timer 70 begins counting down. Temperature controller 68 allows for the desired temperature to be set. Controller 68 also monitors the temperature during the heating or cooling process. Toggle switch 46 is employed to switch between the heating and cooling processes by changing the polarity of the current. A solid state relay 262 is provided to turn on or turn off power to the Peltier devices. A bridge 264 transforms alternating current into direct current. Hence, after timer 70 is set and a temperature is specified in controller 68, push-button switch 48 is actuated. At the expiration of timer 70 the Peltier devices are shut off to stop heating or cooling.

Temperature controller 66 is provided to monitor the temperature of coolant flowing through fluid conduit or cooling plate 115 adjacent Peltier devices 178. If an upper limit of temperature is exceeded, the Peltier devices are shut down so that overheating and damage to the Peltier devices will not occur.

As previously described, synthesizer 10 includes a programmable controller 34 (see FIG. 2) to oversee and control operation of the various components of the synthesizer. Controller 34 is also useful in that different sequences of events may be programmed into synthesizer 10. Moreover, the controller may be coupled to a personal computer and various types of software may be downloaded from the personal computer to controller 34. In this way, the operation of the various components of synthesizer 10 may be conveniently programmed from a personal computer.

Referring now to FIGS. 9–14, wash plate 28 will be described in greater detail. Wash plate 28 comprises a top plate 266 and a bottom plate 268. Top plate 266 defines a top surface 270 and bottom plate 268 defines a bottom surface 272. A gasket 274 is disposed between top plate 266 and bottom plate 268. Disposed with bottom plate 268 are a plurality of liquid transport channels 276 and a plurality of gas transport channels 278. Connecting each of liquid transport channels 276 is a cross channel 280, and connecting gas transport channels 278 is a cross channel 282. Connected to cross channel 280 is a line 284 which terminates in a liquid supply port 286. A gas supply port 288 is connected to cross channel 282 by a line 290.

Top plate 266 and bottom plate 268 are preferably constructed of a metal or alloy, such as aluminum. The various lines and channels may be formed by milling, drilling, and the like. Gasket 274 is preferably constructed of a resilient material, such as rubber. Alternatively, plates 266 and 268 can be constructed of a variety of materials which are capable of defining the various channels and lines. For example, such materials may include plastics, composites, and the like.

Figure 12:
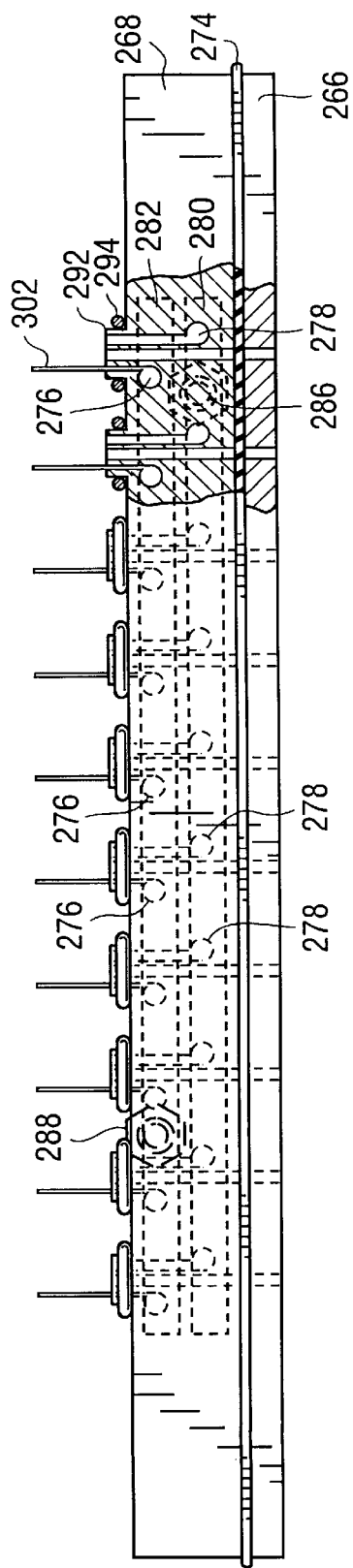
FIG. 12 is a side view of the wash plate of FIG. 9.
Figure 13:
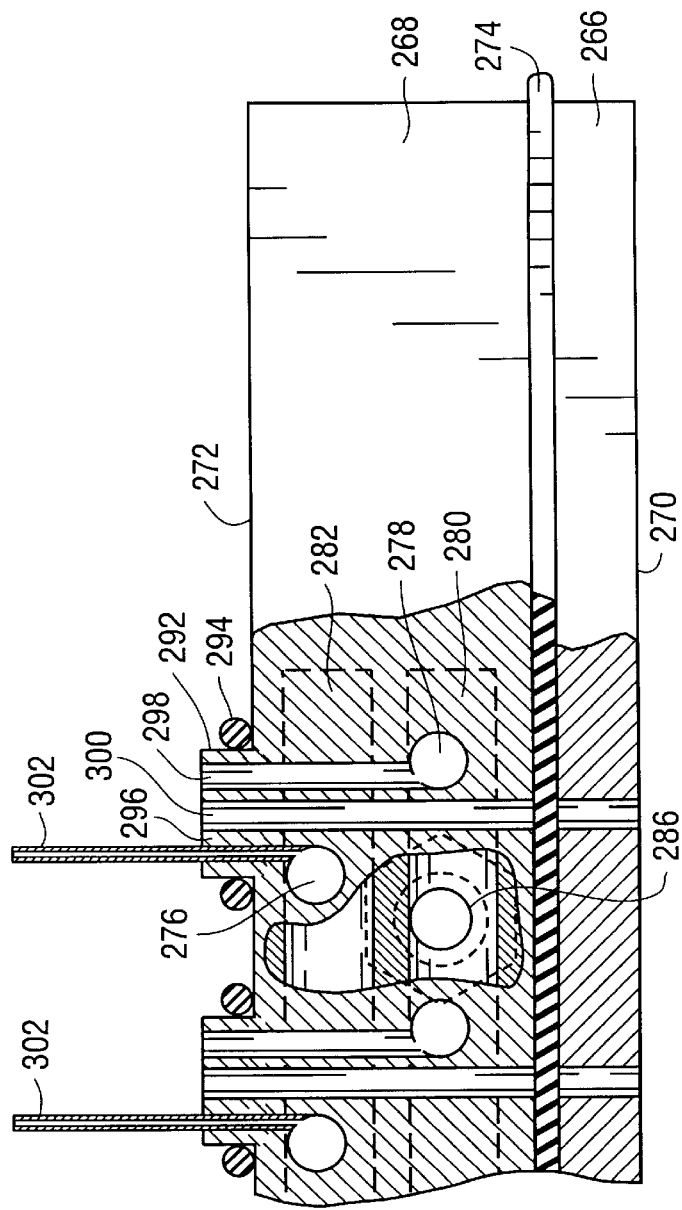
FIG. 13 is a more detailed side view of the wash plate of FIG. 12.
Figure 14:
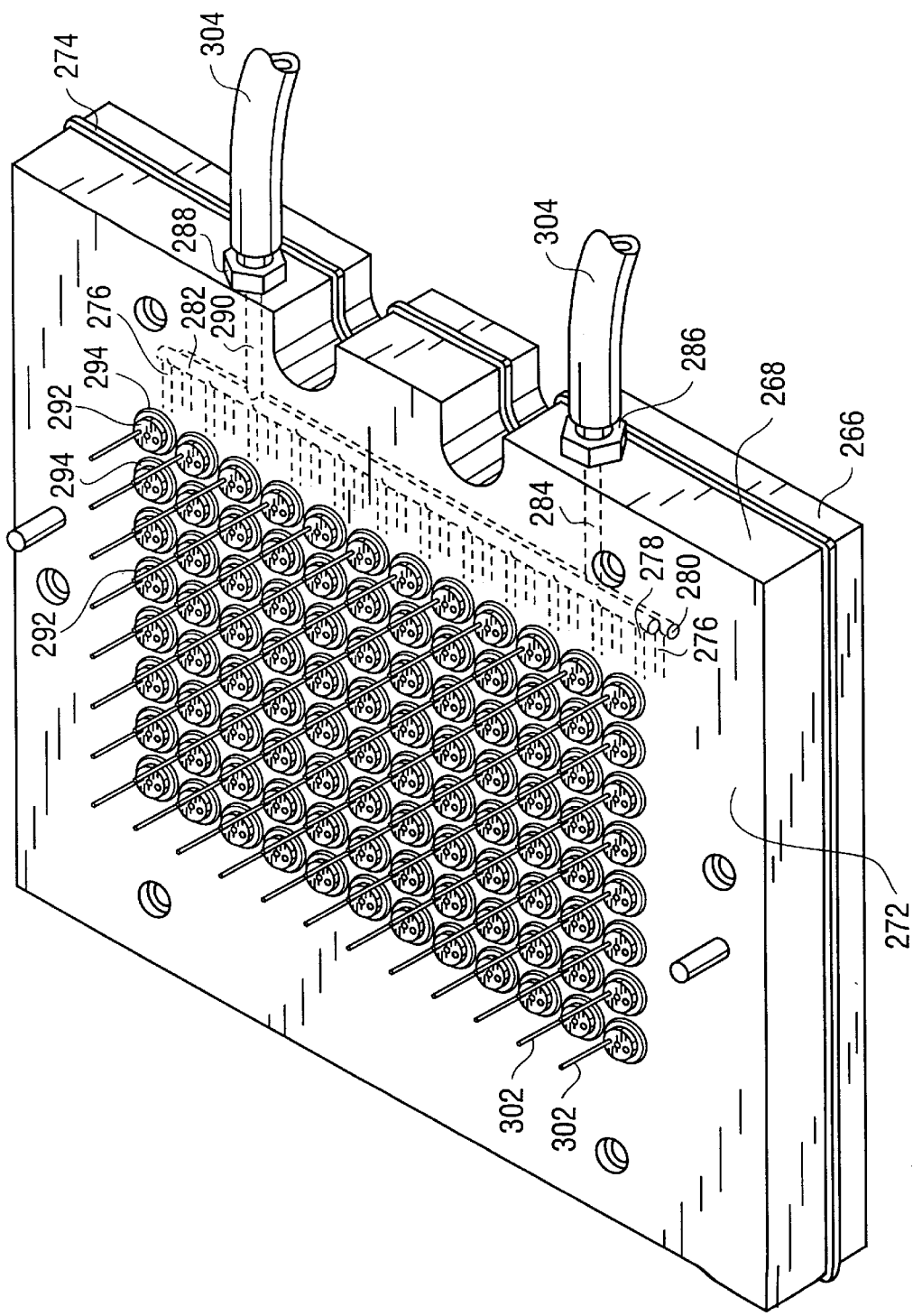
FIG. 14 is a bottom perspective view of the wash plate of FIG. 9.

As best illustrated in FIG. 14, bottom plate 268 includes a plurality of cylindrical raised regions 292 which are adapted to be received within reaction vessels 122 (see FIG. 5). Conveniently, a gasket 294 is placed about each of raised regions 292 to form a seal between raised regions 292 and the reaction vessels. Each raised region 292 includes a liquid delivery orifice 296, a gas delivery orifice 298 and a through hole 300. Coupled to each liquid delivery orifice 296 is a tubular tip 302. Each liquid delivery orifice 296 is in communication with one of the liquid transport channels 276 as best illustrated in FIGS. 12 and 13. Similarly, each gas delivery orifice 298 is in communication with one of the gas transport channels 278. In this way, a liquid that is introduced through liquid supply port 286 passes through line 284, through cross channel 282, through liquid transport channels 276 and through tips 302 where the liquid exits wash plate 28. Hence, with such a configuration, wash plate 28 may be coupled to reaction vessel block 116 (see FIG. 5) and a liquid, such as a washing solution, introduced through liquid supply port 286 to introduce a washing solution into each of the reaction vessels. Preferably, liquid transport channels 276 and cross channel 280 will have a length and cross sectional area which produces a flow resistance value that is less than a flow resistance value produced by all of tips 302. In this way, the flow through tips 302 will not be limited by the transport channels and the cross channel.

In a similar manner, a gas, such as argon, may be introduced through gas supply port 288 where it passes through line 290, through cross channel 282 and into gas transport channels 276 where it will exit through gas delivery orifices 298. Conveniently, tubing 304 is coupled to ports 286 and 288 to allow a liquid source and a gas source to be coupled to wash plate 28. As previously described, tubing 304 may be connected to the washing system valves 82 of chemical synthesizer 10 so that various gases or liquids may be supplied to wash plate 28 directly from synthesizer 10.

As best shown in FIG. 13, through hole 300 extends from top surface 270 to bottom surface 272, with gasket 274 blocking a portion of the through hole. In this way, when wash plate 28 is coupled to a plurality of reaction vessels, contamination through hole 300 is prevented. To gain access to the reaction vessel 300, a pointed instrument, such as a needle or syringe, is inserted through gasket 274. A fluid may then be injected into the reaction vessel through hole 300. When the needle or syringe is removed, the resilience of gasket 274 will close the hole so that contamination is again prevented. Through hole 300 is thus advantageous in that various chemicals or fluids may be manually introduced to the reaction vessels as required simply by inserting a needle through hole 300.

In summary, wash plate provides a convenient way to simultaneously deliver an approximately equal amount of a liquid or a gas into a plurality of wells. Moreover, wash plate 28 is removable from synthesizer 10 so that it may be used only when needed.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A chemical synthesizing device comprising:

a housing having a base and sides which define an interior;

a reaction vessel block having a plurality of reaction vessels which are adapted to hold solid supports therein, wherein the reaction vessel block is disposed in the interior of the housing and is movable relative to the housing;

a mixing apparatus disposed within the interior of the housing which agitates the reaction vessel block to mix chemicals within the reaction vessels;

a gasket attached to the base, wherein the gasket and the base form a cavity; and a vacuum source to create a vacuum within the cavity, wherein the vacuum is adapted to secure the housing to an operating surface such that the housing is held generally stationary upon operation of the mixing apparatus to agitate the reaction vessels within the housing.

2. A device as in claim 1, wherein the mixing apparatus comprises a vortexing motor.

3. A chemical synthesizing system comprising:

an operating surface;

a chemical synthesizing device comprising a housing having a base and sides which define an interior;

a reaction vessel block having a plurality of reaction vessels which are adapted to hold solid supports therein, wherein the reaction vessel block is disposed in the interior of the housing and is movable relative to the housing;

a mixing apparatus disposed within the housing which agitates the reaction vessel block to mix chemicals within the reaction vessels;

a gasket attached to the base around an outer periphery of the base, wherein the gasket and the base form a cavity that is enclosed when the gasket rests on the operating surface; and a vacuum source to create a vacuum within the cavity to secure the housing to the operating surface so that the housing is held generally stationary during operation of the mixing apparatus.

4. A system as in claim 3, wherein the mixing apparatus comprises a vortexing motor.

* * * * *